United States Patent
Jensen et al.

(10) Patent No.: US 7,923,047 B2
(45) Date of Patent: *Apr. 12, 2011

(54) SEASONING AND METHOD FOR SEASONING A FOOD PRODUCT WHILE REDUCING DIETARY SODIUM INTAKE

(75) Inventors: Michael Jensen, Omaha, NE (US); Gordon Smith, Omaha, NE (US); Shawn Fear, Omaha, NE (US); Lance Schilmoeller, Omaha, NE (US); Clinton Johnson, Omaha, NE (US)

(73) Assignee: ConAgra Foods RDM, Inc., Omaha, NE (US)

( * ) Notice: Subject to any disclaimer, the term of this patent is extended or adjusted under 35 U.S.C. 154(b) by 932 days.

This patent is subject to a terminal disclaimer.

(21) Appl. No.: 11/708,667

(22) Filed: Feb. 20, 2007

(65) Prior Publication Data
US 2008/0003344 A1 Jan. 3, 2008

Related U.S. Application Data

(60) Provisional application No. 60/817,993, filed on Jun. 30, 2006, provisional application No. 60/847,724, filed on Sep. 27, 2006, provisional application No. 60/847,725, filed on Sep. 27, 2006, provisional application No. 60/847,734, filed on Sep. 27, 2006, provisional application No. 60/847,739, filed on Sep. 27, 2006.

(51) Int. Cl.
*A23L 1/22* (2006.01)

(52) U.S. Cl. ............... 426/97; 426/74; 426/99; 426/279; 426/289; 426/302; 426/443; 426/534; 426/549; 426/601; 426/648; 426/649

(58) Field of Classification Search .................... 426/97, 426/99, 74, 289, 297, 302, 534, 549, 601, 426/648, 649, 443
See application file for complete search history.

(56) References Cited

U.S. PATENT DOCUMENTS

| | | | |
|---|---|---|---|
| 3,097,952 A | | 7/1963 | Bresette |
| 3,758,311 A | * | 9/1973 | Fortmann ........................ 426/20 |
| 4,068,006 A | | 1/1978 | Moritz |
| 4,096,281 A | | 6/1978 | Young et al. |
| 4,220,667 A | * | 9/1980 | Jakinovich, Jr. ................ 426/96 |
| 4,375,483 A | * | 3/1983 | Shuford et al. ............ 426/330.6 |
| 4,385,076 A | | 5/1983 | Crosby ......................... 426/533 |

(Continued)

FOREIGN PATENT DOCUMENTS

DE 69911056 T2 3/2004

(Continued)

OTHER PUBLICATIONS

PCT/US07/14782 International Search Report—Date of Mailing, Dec. 3, 2007.

(Continued)

*Primary Examiner* — Helen F Heggestad
(74) *Attorney, Agent, or Firm* — Merchant & Gould P.C.

(57) ABSTRACT

A seasoning for reducing dietary sodium intake is disclosed. The portion of seasoning has a mean particle size of less than or equal to 20 microns. In one embodiment, the invention is a seasoning comprising a first seasoning component including a salt and a second seasoning component selected for at least one of complementing and reducing the amount of the first seasoning component required for flavoring a food product.

58 Claims, 15 Drawing Sheets

Simplified Dose-Reponse Curve

U.S. PATENT DOCUMENTS

| Number | | Date | Inventor | Class |
|---|---|---|---|---|
| 4,434,187 | A | 2/1984 | Chandler et al. | 426/652 |
| 4,515,769 | A | 5/1985 | Merritt et al. | |
| 4,560,574 | A | 12/1985 | Meyer | 426/649 |
| 4,563,359 | A | 1/1986 | Shimizu et al. | |
| 4,789,558 | A | 12/1988 | Winkler et al. | 426/639 |
| 5,094,862 | A | 3/1992 | Bunick et al. | |
| 5,098,723 | A | 3/1992 | DuBois et al. | |
| 5,139,794 | A | 8/1992 | Patel et al. | |
| 5,298,268 | A | 3/1994 | Maegli | |
| 5,425,956 | A | 6/1995 | Shahidi et al. | |
| 5,494,689 | A | 2/1996 | Lee et al. | |
| 5,631,038 | A | 5/1997 | Kurtz et al. | 426/649 |
| 5,843,514 | A | 12/1998 | Yamada et al. | 426/650 |
| 5,871,803 | A | 2/1999 | Bonorden et al. | 426/649 |
| 5,897,894 | A | 4/1999 | Glass | 426/89 |
| 5,919,505 | A | 7/1999 | Monsalve et al. | 426/107 |
| 5,958,488 | A | 9/1999 | Baker et al. | |
| 5,997,916 | A | 12/1999 | Dickerson et al. | 426/74 |
| 6,083,552 | A | 7/2000 | Kershman et al. | 426/559 |
| 6,090,419 | A | 7/2000 | Popplewell et al. | |
| 6,129,942 | A | 10/2000 | Prakash et al. | 426/548 |
| 6,146,680 | A | 11/2000 | Prakash et al. | 426/548 |
| 6,149,953 | A | 11/2000 | Redding, Jr. | |
| 6,180,156 | B1 | 1/2001 | Prakash et al. | 426/548 |
| 6,207,205 | B1 | 3/2001 | Patel et al. | 426/107 |
| 6,210,721 | B1 | 4/2001 | Dickerson et al. | 426/74 |
| 6,214,402 | B1 | 4/2001 | Fotos et al. | 426/548 |
| 6,259,079 | B1 | 7/2001 | Ji et al. | 219/727 |
| 6,291,004 | B1 | 9/2001 | Prakash et al. | 426/548 |
| 6,333,059 | B1 | 12/2001 | Monsalve et al. | 426/107 |
| 6,517,903 | B1 | 2/2003 | Schmidt | |
| 6,534,102 | B2* | 3/2003 | Kazemzadeh | 426/72 |
| 6,541,050 | B1 | 4/2003 | Bonorden et al. | 426/74 |
| 6,569,478 | B1 | 5/2003 | Leser et al. | |
| 6,623,772 | B1 | 9/2003 | Defilippi | |
| 6,706,296 | B2 | 3/2004 | Dickerson et al. | 426/74 |
| 6,887,493 | B2 | 5/2005 | Shefer et al. | 424/490 |
| 2003/0008046 | A1 | 1/2003 | Gerlat et al. | 426/534 |
| 2003/0118696 | A1 | 6/2003 | Dickerson et al. | 426/74 |
| 2004/0096150 | A1 | 5/2004 | Schilmoeller et al. | |
| 2004/0219283 | A1 | 11/2004 | Evans | 426/641 |
| 2005/0031717 | A1 | 2/2005 | DeSimone et al. | 424/760 |
| 2005/0191389 | A1 | 9/2005 | Jones et al. | |
| 2005/0238788 | A1 | 10/2005 | Buononato et al. | |
| 2006/0088648 | A1 | 4/2006 | Teoh et al. | |
| 2006/0286275 | A1 | 12/2006 | Salemme et al. | 426/649 |
| 2007/0292592 | A1* | 12/2007 | Zasypkin et al. | 426/649 |
| 2008/0003344 | A1 | 1/2008 | Jensen et al. | |
| 2008/0075813 | A1 | 3/2008 | Smith et al. | |
| 2008/0088790 | A1 | 4/2008 | Ohashi | |

FOREIGN PATENT DOCUMENTS

| | | | |
|---|---|---|---|
| EP | 0 063 835 | A2 | 11/1982 |
| EP | 0021483 | | 2/1984 |
| EP | 0 518 507 | A1 | 12/1992 |
| EP | 060573 | A1 | 7/1993 |
| EP | 0677249 | B1 | 3/1995 |
| EP | 1139794 | B1 | 9/1999 |
| JP | 2003304839 | * | 10/2003 |
| JP | 2006141223 | * | 8/2006 |
| WO | WO 85/00958 | | 3/1985 |
| WO | WO94/02034 | | 2/1994 |
| WO | WO 96/39050 | | 12/1996 |
| WO | WO99/12954 | | 3/1999 |
| WO | WO99/12955 | | 3/1999 |
| WO | WO99/12956 | | 3/1999 |
| WO | WO99/12957 | | 3/1999 |
| WO | WO00/15050 | | 3/2000 |
| WO | WO00/36933 | | 6/2000 |
| WO | WO 01/05256 | A1 | 1/2001 |
| WO | WO2004/105505 | | 12/2004 |

OTHER PUBLICATIONS

International Search Report and Written Opinion mailed Apr. 18, 2008.

International Search Report and Written Opinion mailed May 22, 2008.

Miller, M. et al., "Effect of Sodium Chloride Particle Size and Shape on Nonelectrostatic and Electrostatic Coating of Popcorn," *Journal of Food Science*, vol. 67, No. 1, pp. 198-201 (2002).

Ricks, N. et al., "Food Powder Characteristics Important to Nonelectrostatic and Electrostatic Coating and Dustiness," *Journal of Food Science*, vol. 67, No. 6, pp. 2256-2261 (2002).

Saltiness Perception and Consumer Acceptability of Salt Reduced Potato Crisps; Chanchal Narain, Anais Fadalti, Tracey Phelps and David Kilcast; Leatherhead Food International Limited; Research Report No. 908; Dec. 2006.

International Search Report mailed Jun. 3, 2008.

Vijay Lyall, et al., *The Mammalian Amiloride-Insensitive Non-Specific Salt Taste Receptor Is a Vanilloid Receptor-1 Variant*, J Physiol, 2004, © The Physiological Society, 13 pages, 147-159.

Eric Neyraud, et al., *NaCl and Sugar Release, Salivation and Taste During Mastication of Salted Chewing Gum*, Physiology & Behavior, vol. 79, © 2003, Published by Elsevier, Inc., 7 pages, 731-737.

Timothy A. Gilbertson, et al., *Taste Transduction: Appetizing Times in Gustation*, NeuroReport, vol. 14, No. 7, May 23, 2003, © Lippincott Williams & Wilkins, 7 pages, 905-911.

Dr. Alan Rawle, *Technical Paper: Basic Principles of Particle Size Analysis*, Malvern Instruments Limited, Enigma Business Park, Grovewood Road, Malvern, Worcestershire, WR14 1XZ, UK, www.malvern.co.uk, 8 pages.

Amiji et al., Applied Physical Pharmacy, 2002, McGraw-Hill Professional, p. 32.

Final Office Action mailed Jan. 19, 2010 from U.S. Appl. No. 11/904,554.

Final Office Action mailed Jul. 21, 2010 from U.S. Appl. No. 11/703,067.

Final Office Action mailed Jul. 6, 2010 from U.S. Appl. No. 11/707,774.

Non-Final Office Action mailed Apr. 29, 2010 from U.S. Appl. No. 11/820,530.

Non-Final Office Action mailed Dec. 7, 2009 from U.S. Appl. No. 11/707,774.

Non-Final Office Action mailed Feb. 2, 2010 from U.S. Appl. No. 11/703,067.

Non-Final Office Action mailed Jul. 23, 2009 from U.S. Appl. No. 11/904,554.

Restriction Requirement Office Action mailed Aug. 26, 2009 from U.S. Appl. No. 11/707,774.

Restriction Requirement Office Action mailed Oct. 14, 2009 from U.S. Appl. No. 11/703,067.

Final Office Action mailed Oct. 14, 2010 from U.S. Appl. No. 11/820,530.

Final Office Action mailed Jul. 6, 2010 from U.S. Appl. No. 11/707,774.

Final Office Action mailed Jul. 21, 2010 from U.S. Appl. No. 11/703,067.

* cited by examiner

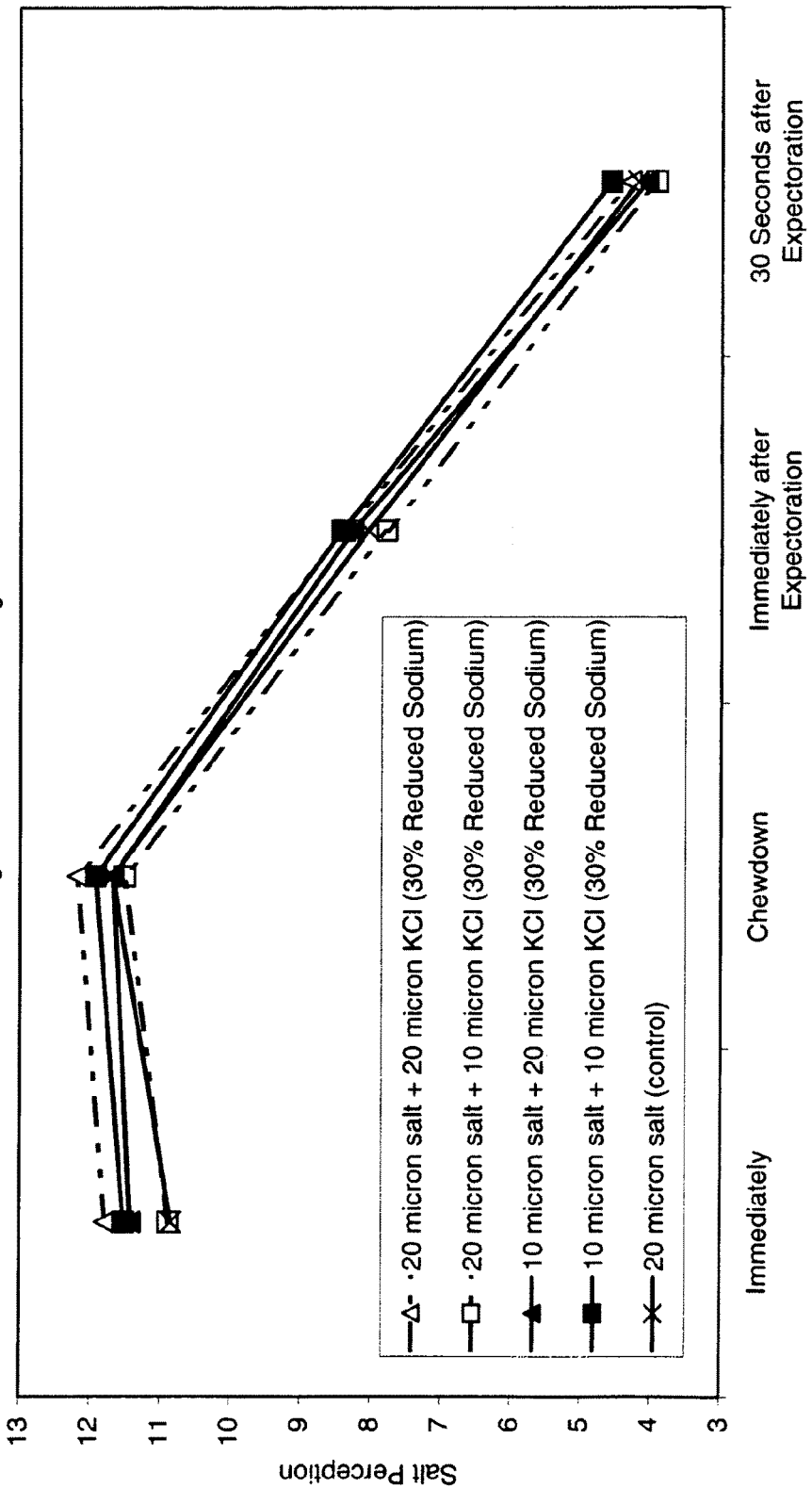

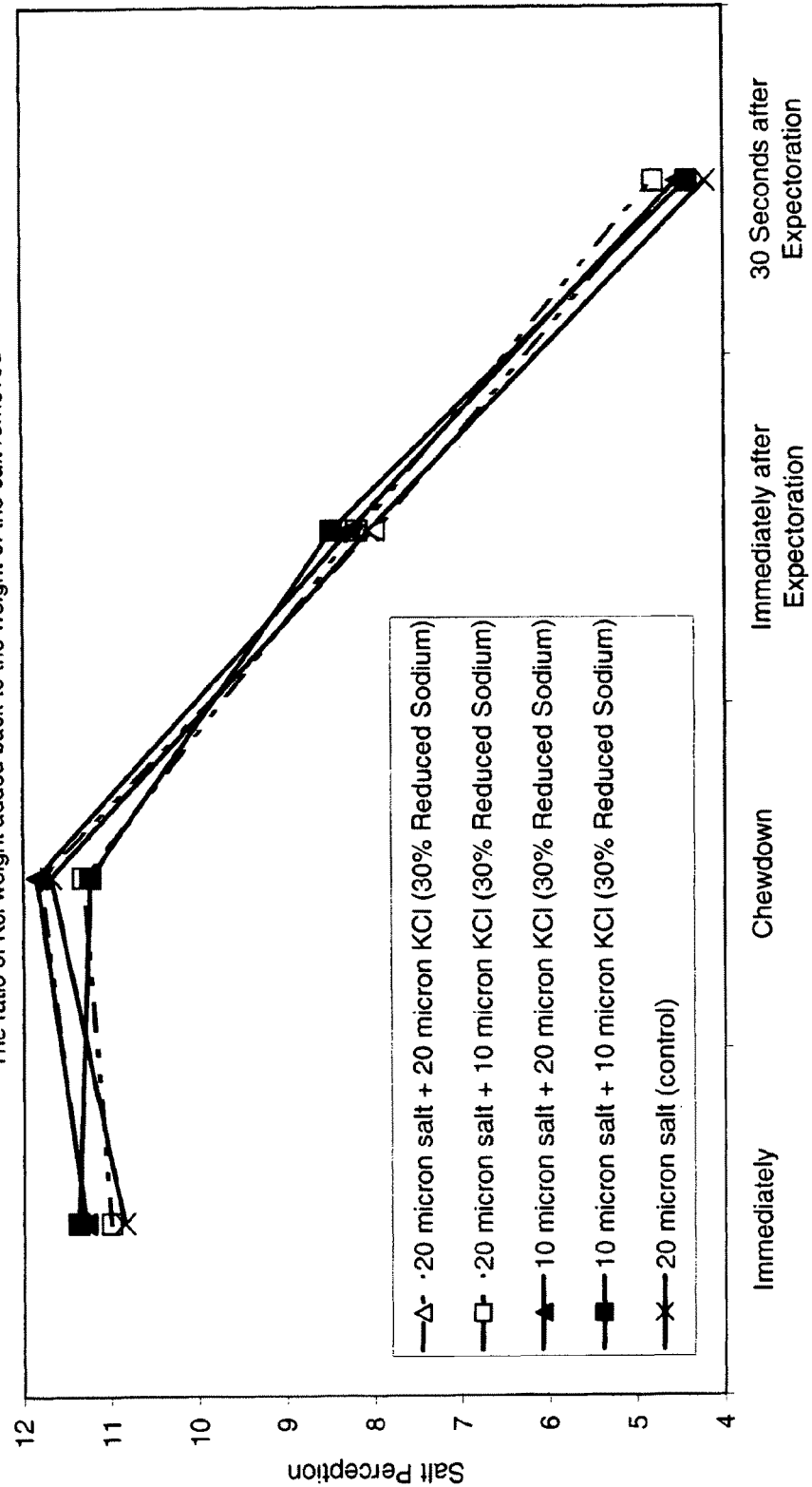

SEASONING AND METHOD FOR SEASONING A FOOD PRODUCT WHILE REDUCING DIETARY SODIUM INTAKE

CROSS-REFERENCE TO RELATED APPLICATIONS

The present application claims the benefit under 35 U.S.C. §119(e) of U.S. Provisional Application Ser. No. 60/817,993, filed Jun. 30, 2006, and U.S. Provisional Application Ser. Nos. 60/847,724, 60/847,725, 60/847,734, and 60/847,739, all filed Sep. 27, 2006. Said U.S. Provisional Application Ser. Nos. 60/817,993, 60/847,724, 60/847,725, 60/847,734, and 60/847,739 are herein incorporated by reference in their entirety.

FIELD OF THE INVENTION

The present invention generally relates to the field of seasoning technologies, and more particularly to a seasoning utilized to maintain taste impact while reducing seasoning amount for a desired taste.

BACKGROUND OF THE INVENTION

Salt has a rich history as a preservative, spice, flavor enhancer, and chemical feedstock. Salt is an essential nutrient which acts to maintain: (1) concentration and volume of extracellular fluid, (2) osmotic pressure and body water balance, (3) acid-base equilibrium, (4) nerve and muscle function, and (5) glucose and other nutrient absorption.

From a dietary perspective, individuals may respond differently to varying intake levels of sodium. Excessive sodium consumption may lead to detrimental effects on the circulatory system, such as high blood pressure, as well as kidney affections, water retention, and stomach ulcers. While there is a recommendation for reduced sodium intake, there is a strong demand for the flavor and organoleptic qualities of salt, particularly sodium chloride. Only sodium chloride elicits a true salt taste, whereas other salts have mixed tastes that are usually described as bitter, medicinal, or unpleasant. Some salt replacements ineffectually simulate the flavor of sodium chloride by producing composite substances that mimic this flavor.

As a nutrient, sodium plays an important roll in maintaining concentration and volume of extracellular fluid. It acts with other electrolytes, such as potassium, to regulate osmotic pressure and maintain water balance within the body. Additionally, sodium is a major factor in maintaining cellular acid-base equilibrium, transmitting nerve impulses, relaxing muscles after contraction, absorbing glucose, and nutrient transport across cell membranes.

Some health experts believe excess sodium may lead to or exacerbate high blood pressure, kidney affections, water retention, and stomach ulcers. Despite health concerns and nutrition recommendations, many people frequently consume an excessive amount of salt. Prior attempts to maintain the desired sodium chloride taste while not exceeding dietary sodium nutrition recommendations have failed to sufficiently address the problem of avoiding excessive sodium intake while retaining acceptable flavor.

Salt plays an important role and is highly sedirable in seasoning, enhancing, and potentiating flavor in foods and beverages. More particularly, sodium chloride, a salt, enhances the organoleptic potential, taste, and flavor of food. Several theories exist as to how flavor enhancers and potentiators work. It is believed by some that flavor potentiators increase the sensitivity of the taste buds, and flavor enhancers act as solvents and free more flavors from foods. More flavor is then available to penetrate the taste buds. Flavor is the quality produced by the sensation of taste. Saltiness is one of the five basic tastes. Other basic tastes include sourness, bitterness, sweetness, and umami (savoriness). Sodium chloride is a major source of salty taste and provides important nutrients for the body.

The ability of salt to enhance flavors in food is universally appreciated. For example, salt is known to potentiate sweetness, decreases bitterness, and add "roundness" to foods. As a result, salt is routinely added to processed foods. Prior, attempts to decrease salt or sodium content have resulted in reduced flavor (both salt and "food" flavors). Since salt enhances a desired food flavor, a decrease in salt or sodium content will generally require food flavor fortification. Typically done with salty-tasting substitutes, however, no true substitute has been found for saltiness.

Consequently, there remains the need for a seasoning which has flavor and organoleptic properties similar to sodium chloride while reducing the amount of dietary sodium needed for a desired salty taste.

SUMMARY OF THE INVENTION

A seasoning for flavoring a food product and/or reducing the amount of dietary sodium is described in accordance with exemplary embodiments of the present invention. Also described is a method for seasoning food products, whereby a second seasoning component is selected for at least one of complementing a first seasoning component and reducing the amount of the first seasoning component required for producing a desirably flavored food product. For example, a snack food utilizes less sodium chloride, with a mean particle size less than 20 microns, as a component in a seasoning or as a separate seasoning while retaining the desirable salty flavor associated with sodium chloride when combined with other salts and/or flavorings.

Further described is a salty snack product, such as microwave popcorn, ready-to-eat popcorn, crackers, and cookies, including a seasoning with a mean particle size less than 20 microns. Additionally, a seasoning including a first seasoning component and a second seasoning component selected for at least one of complementing the first seasoning component and reducing the amount of the first seasoning component required for producing a desirably flavored food product wherein the second seasoning component is potassium chloride and/or sea salt. The first seasoning component has a mean particle size less than or equal to 20 microns.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 9A is a graph illustrating the effect of sodium chloride and potassium chloride on the intensity of salt perception at four predetermined times, wherein the sizes of sodium chloride and potassium chloride are varied and compared to a control salt;

FIG. 9B is a graph illustrating the effect of sodium chloride and potassium chloride on the intensity of salt perception at four predetermined times, wherein the sizes of sodium chloride and potassium chloride are varied and compared to a control salt, and one-and-a-half times the amount of sodium chloride removed is replaced with potassium chloride;

DETAILED DESCRIPTION OF THE INVENTION

Figure 1:
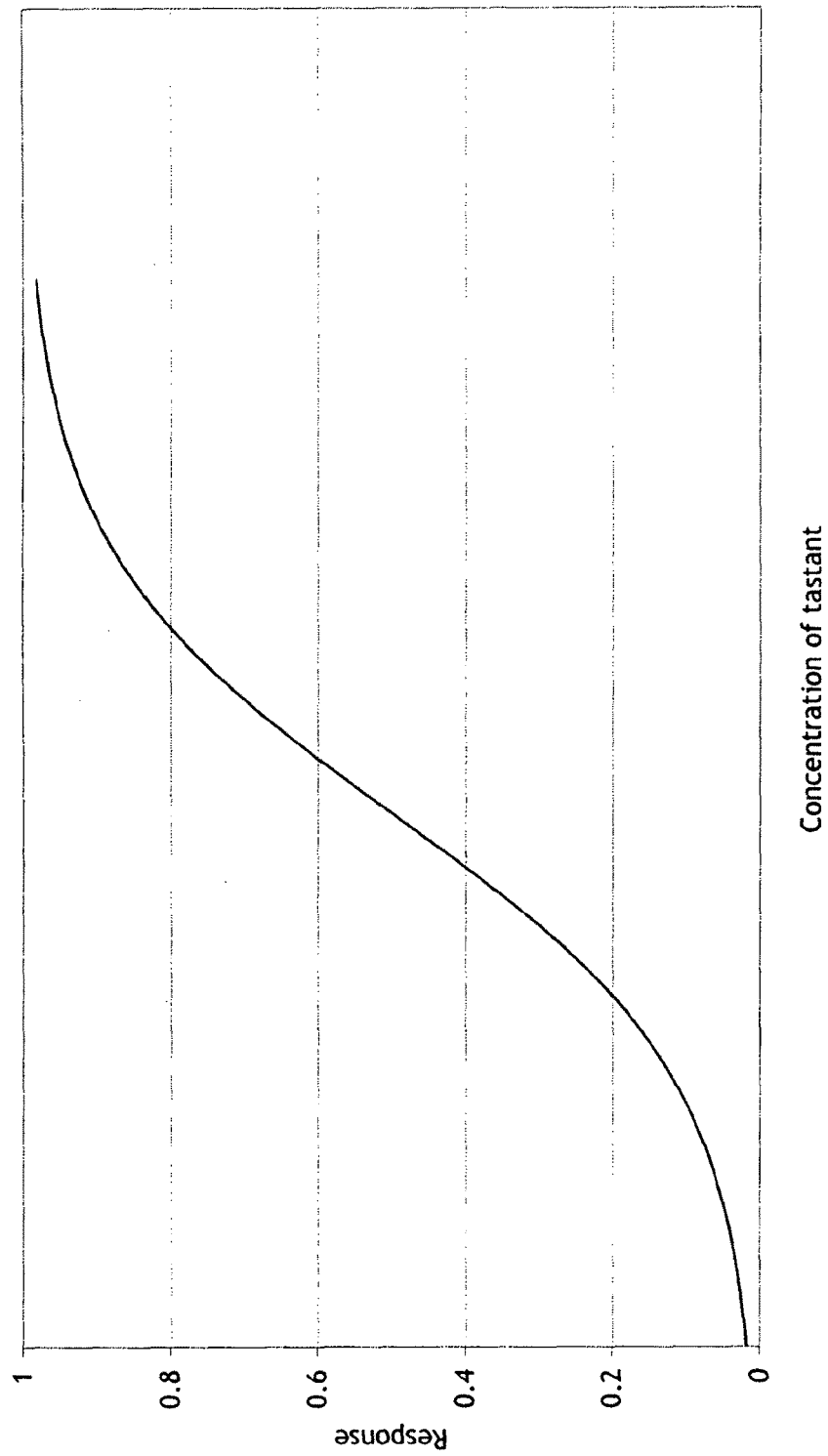
FIG. 1 is a model dose-response curve for determining a response for given concentrations of tastant A.

Reference will now be made in detail to the presently preferred embodiments of the invention, examples of which are illustrated in the accompanying drawings.

I. Particles

A. Size Methodology

Herein, particle size generally refers to the size of a single particle, an agglomerated particle, the core of a coated or partially coated particle, and the like. The term "particle" may refer to a crystalline or lattice structure, regular three-dimensional shapes (referring to coordination geometry), and irregular shapes having no predefined or specific particle orientation or geometry. The particle size may be evaluated through use of a particle analyzer. For example, a Malvern Laser Particle Size Analyzer or an optical particle image analyzer may be used to obtain a particle size. The mean particle size may then be determined from the particle size distribution. Hereinafter, particle size refers to mean particle size on a distribution curve, and not a sieve analysis. Thus, mean particle size refers to particle size as valued on a distribution curve constructed or plotted utilizing, for example: (1) number of objects, (2) percent by number, (3) percent by mass, or (4) percent by volume (most preferred). Those skilled in the art of particle size analysis will recognize that mean distribution particle size may be determined dry or in a solvent. Additionally, those skilled in the art wilt appreciate that median particle size may be calculated and utilized herein (mean is preferred). In any case, the mean is preferred herein. Pursuant to the description of the invention herein, particle size, is particle size measured by utilizing a laser particle size analyzer.

B. Distribution

In order to measure distribution, small particle sodium chloride was distributed over popped popcorn (as an example of seasoned food). Illustrated in FIGS. 3 through 6, the small particle sodium chloride is evenly and randomly distributed over the popped popcorn surface. The sodium chloride generally adheres to the peaks and the valleys of the popped popcorn surface providing uniform sodium chloride coverage to the whole popped popcorn surface.

Variable-pressure scanning electron microscopy (SEM) was used as a tool to determine if salt with smaller crystal sizes have greater distribution on popped microwave popcorn compared to salt with larger crystal sizes per unit weight. Imagery at various magnifications, illustrated in FIGS. 3 through 6, was used to evaluate samples for salt distribution on these products.

Specifically, microwave popcorn samples were prepared in duplicate within 7 days of analysis. The duplicate samples were popped using a common household-type microwave for 2½ minutes and cooled for 5 minutes. Three kernels from each bag were randomly selected and tempered overnight (~18 hr) at 58° C. After tempering, a small portion of each kernel was removed and placed onto a microscope stage. The samples were subsequently observed at 300×, 1000×, 2000×, and 5000× magnification. Images were collected in an entirely random manner. Representative images from samples containing salts with different mean particle sizes were then compared. Shown in FIGS. 3 through 6, the resulting SEM images illustrate that the smaller sodium chloride particles give a more uniform distribution than the larger sodium chloride particles.

Figure 7:
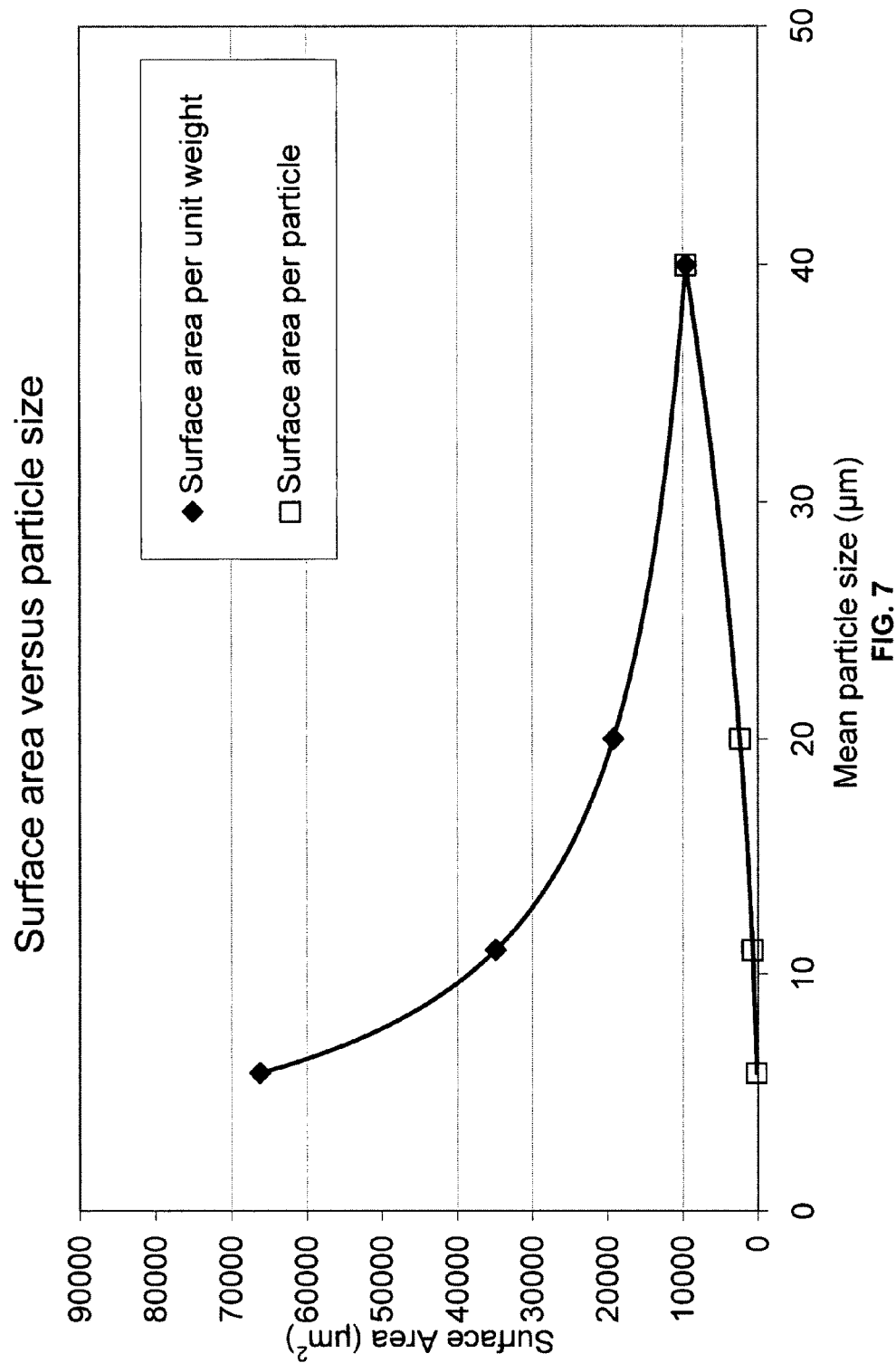
FIG. 7 is a graph illustrating salt particle surface area versus salt particle size, wherein the graph illustrates that the total surface area of a constant weight of salt increases when the mean particle size decreases.

The images illustrated in FIGS. 3 through 6 and the results of the taste test, as illustrated in FIG. 7, show as particle size is reduced the distribution improves. As best illustrated in FIG. 7 (effect of salt particle size on time-intensity salt perception), salt having a mean particle size of 10 microns achieves the greatest salt intensity. As shown in SEM images in FIGS. 3 through 6, small particle sodium chloride is evenly and randomly distributed over the popped popcorn surface. As illustrated in FIG. 7, when salt mean particle size decreases for a constant weight, the total surface area increases. Smaller diameter sodium chloride provides more particles per unit area. This provides the same salt perception with Less salt mass.

As illustrated in FIGS. 3 through 6 and discussed in the preceding paragraph, when salt particle size is reduced, particle distribution improves. Salt particles on the surface of seasoned and popped popcorn illustrated in FIGS. 3 through 6 were counted for determining salt particle distribution. The method for determining the distribution of salt on the surface of the popcorn included counting the number of starch open-cells on each image and counting the number of salt particles on each image. The salt particles counted included the white or light colored particles that were clearly separated. The number of salt particles was divided by the average number of starch open-cells resulting in a ratio representing the number of salt particles to the number of starch open-cells. The results indicate that a smaller salt particle size provides a better distribution than a larger salt particle size of the same weight on the surface of popped popcorn. A salt mean particle size of 5 microns resulted in approximately 5.19 salt particles per starch open-cell for compared to approximately 0.83 salt particles per starch open-cell for a salt mean particle size of 20 microns. The results of the particle count illustrate that a smaller size salt particle gives a better particle distribution for the same weight of salt. The results are shown in Table 1 below.

TABLE 1

Approximate number of salt particles per starch open-cell

| Salt mean particle size | Number of Particles | Starch Open-cells | Salt Particles/ Starch Open-cells |
|---|---|---|---|
| 20 | 97 | 115 | 0.83 |
| 15 | 213 | 104 | 1.82 |
| 10 | 256 | N/A | 2.19 |
| 5 | 607 | 132 | 5.19 |

An excellent description, incorporated herein by reference, for calculating and characterizing particle size may be found at: Rawle, A., *Basic Principles of Particle Size Analysis*, Malvern Instruments Limited, Enigma Business Park, Grovewood Road, Malvern, Worcestershire, WR14 1XZ, UK. The article may be located at: http://www.malvern.co.uk/malvern/kbase.nsf/allbyno/KB000021/$file/Bas ic_principles_of_particle_size_analysis_MRK034-low_res.pdf.

II. Taste Test

A. Methodology

Taste tests evaluated the use of smaller size salt particles on popped popcorn (as an example of a seasoned food). The methodology of each taste test is strictly followed to ensure consistent results. Prior to popcorn presentation to trained taste panelists, a panel technician pops the popcorn in a microwave according to established parameters. Immediately after popping, the popcorn is transferred into a large bowl for a 2 minute wait. After that time, the technician scoops popcorn from the main container using a 3.25 ounce translucent polystyrene soufflé cup, fitting the cup. The sample portions are immediately presented to the trained panelists. Due to the nature of the sample and its preparation, samples are presented in a sequential monadic manner.

Each trained panelist selects four popped kernels from the sample portion and is instructed to choose pieces that best represent the sample presented. For example, if the trained panelist's sample is evenly mixed with highly coated yellow pieces and less coated white pieces, the trained panelist would choose 2 yellow & 2 white pieces for evaluation. All four pieces are put into the mouth. The trained panelist evaluates salt impact immediately after putting the pieces into the mouth, defined as within the first two chews, and at the highest point in chewdown, defined as the highest salt impact observed during chewdown.

The trained panelist is next instructed to collect the sample into a bolus in the center of the mouth and to forcefully expectorate the sample after evaluation. Expectoration is used to ensure that the majority of sample is removed from mouth. Using an individual timer, each trained panelist starts the timer and further evaluates salt impact immediately after expectoration and thirty seconds after expectoration. Each trained panelist records the data using a paper ballot with the evaluation attributes preprinted on the ballot as well as places to record the date, trained panelist number, sample number, and attribute intensities by sample.

At the beginning of each session, the trained panelists are instructed not to lick their lips during evaluation, to rinse the mouth thoroughly with room temperature spring water after evaluations, and to wipe their lips between evaluations. The samples are staggered for evaluation at least five minutes apart. The strength of each attribute is rated on a zero to fifteen point intensity scale or salt perception scale with zero being no strength and fifteen being high strength. This scale incorporates the ability to use tenths of a point and has the potential of 150 scale differentiations. If needed, intensities may be rated greater than fifteen using the same scaling criteria.

B. Results

1. Trained Sensory Panel

Figure 8A:
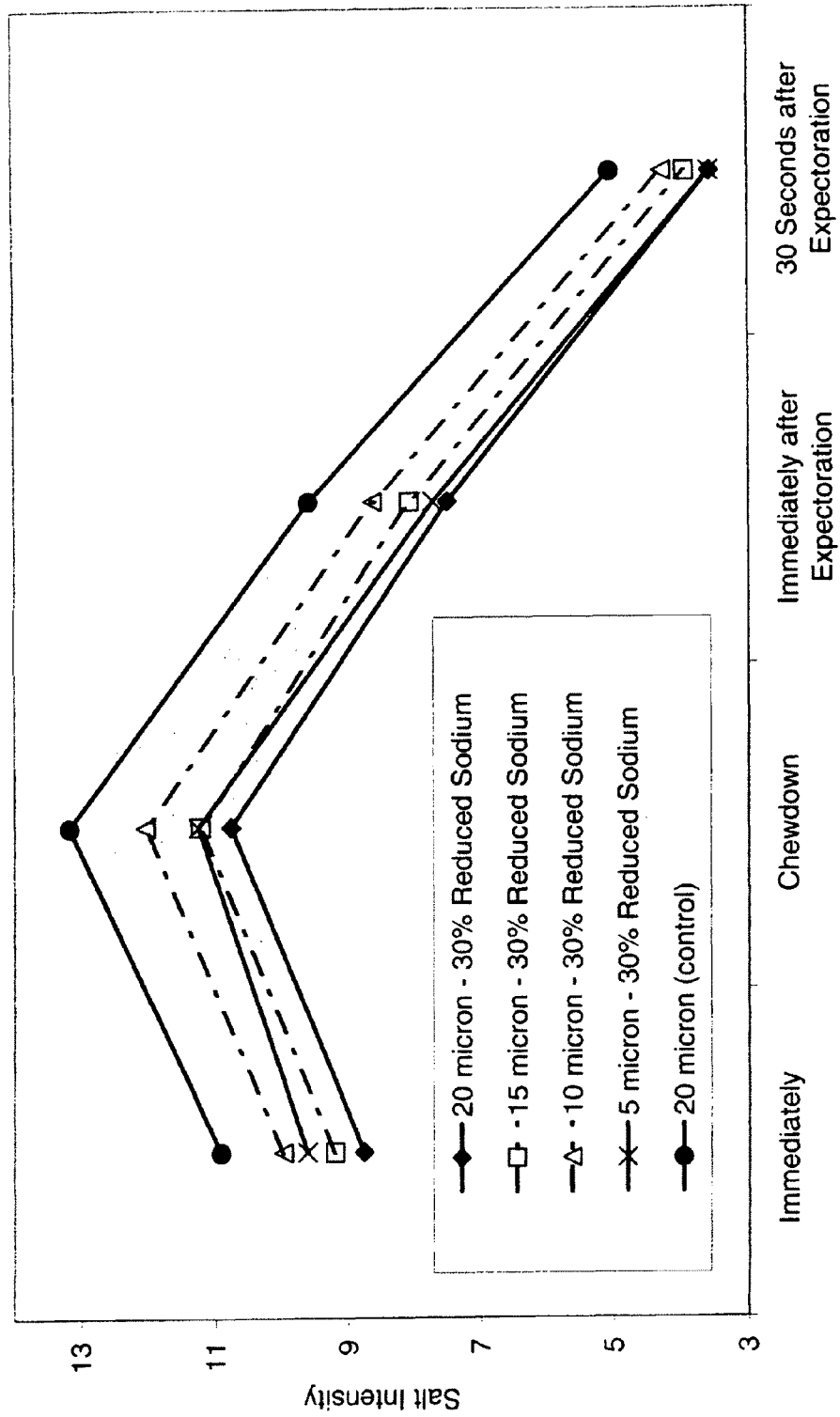
FIG. 8A is a graph illustrating the effect of salt mean particle size on the intensity of salt perception at four predetermined times, wherein a control salt is compared to reduced sodium amounts of salt.
Figure 8B:
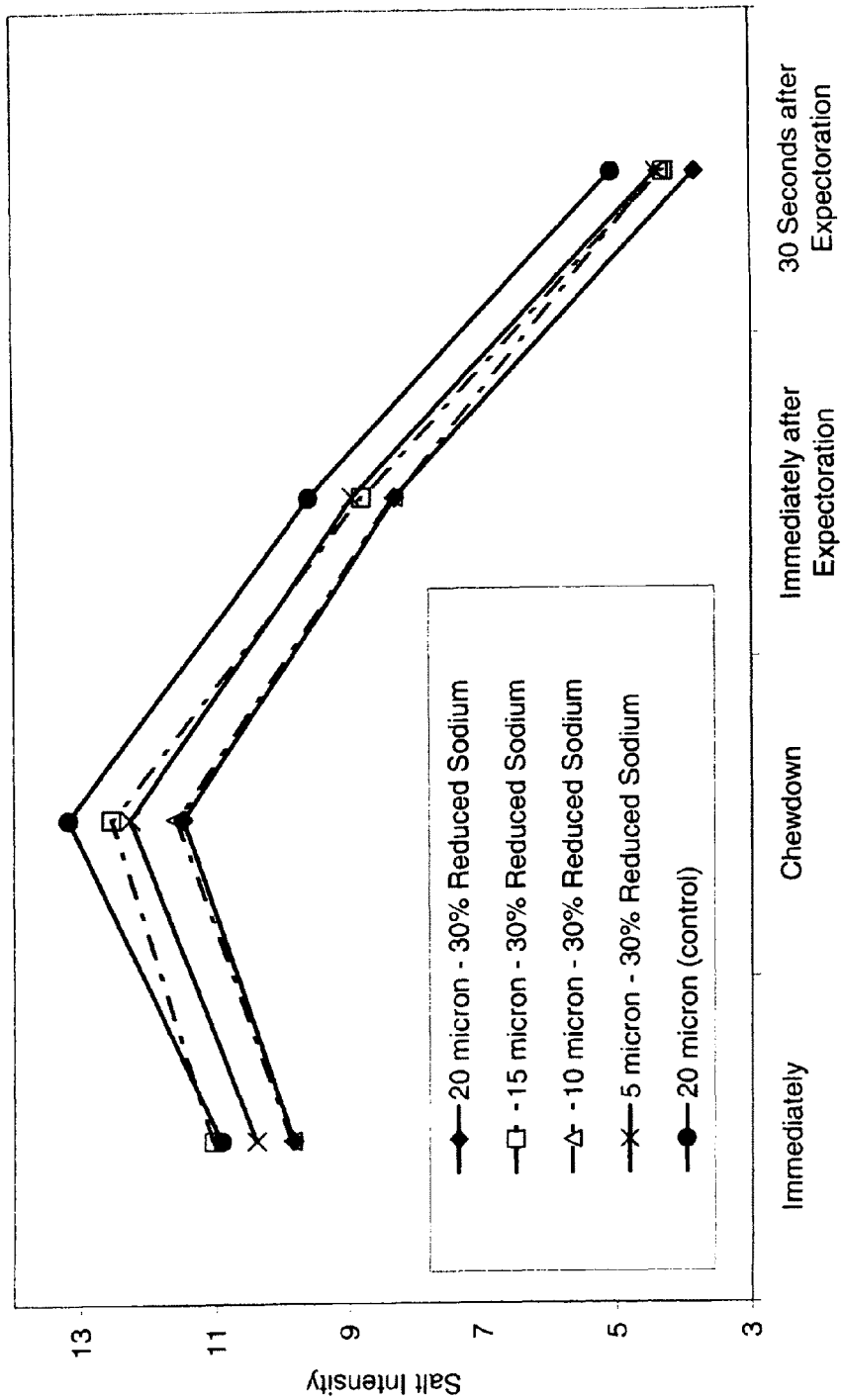
FIG. 8B is a graph illustrating the effect of salt mean particle size on the intensity of salt perception at four predetermined times, wherein a control salt is compared to reduced amounts of sodium chloride with half the amount of sodium removed replaced with potassium chloride.
Figure 8C:
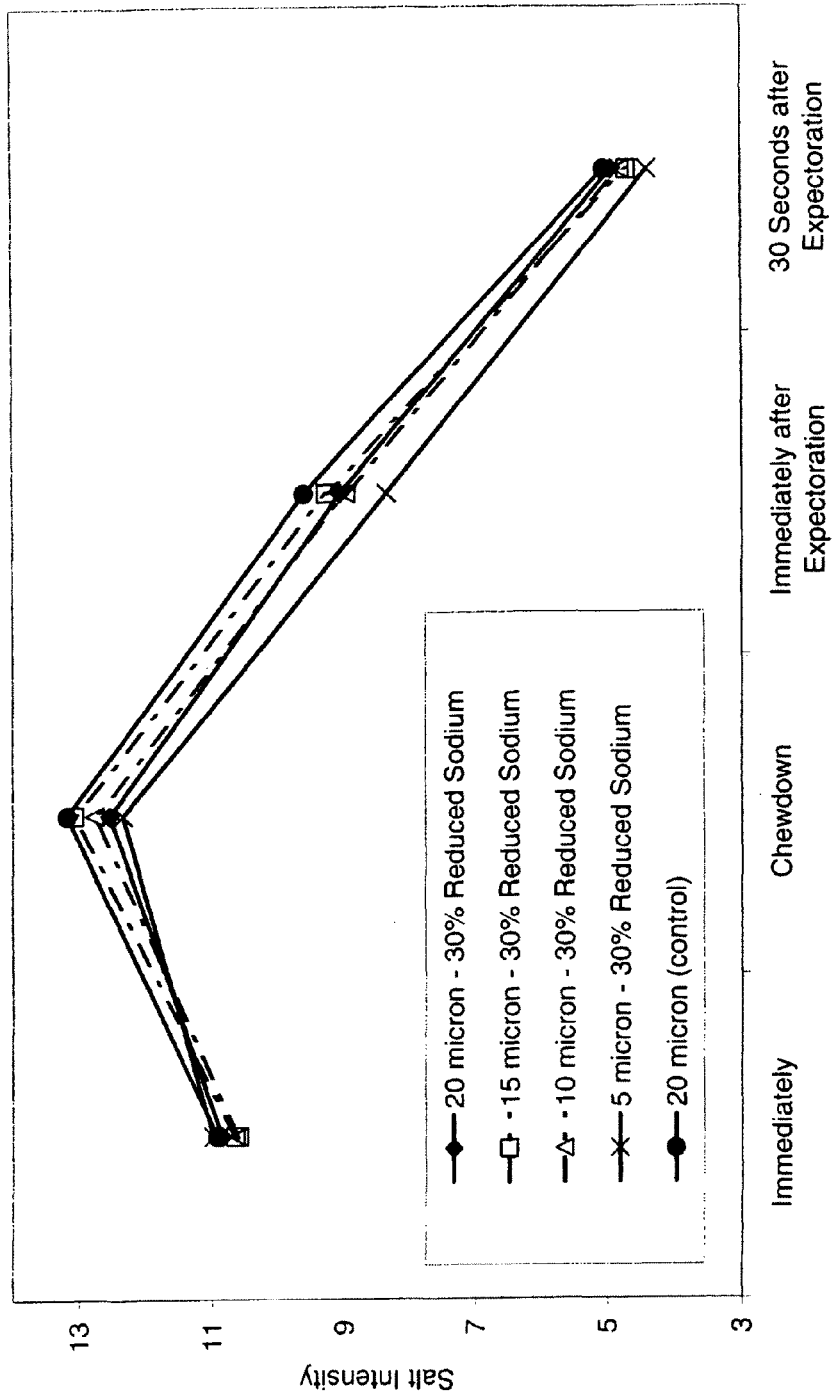
FIG. 8C is a graph illustrating the effect of salt mean particle size on the intensity of salt perception at four predetermined times, wherein a control salt is compared to reduced amounts of sodium chloride with the amount of sodium removed replaced with potassium chloride.

Taste tests have shown that smaller particle salt delivers a greater taste impact over larger particle salt. Illustrated in FIG. 7, the total surface area for a given amount of seasoning increases as the mean particle size decreases. FIG. 8A illustrates the effect of salt mean particle size on the intensity of salt perception at four different predetermined times. In the taste test results shown in FIG. 8A, a control salt is compared to reduced sodium amounts of salt with varying particle sizes according to a panel of trained taste testers. The results show that even with a 30% reduced amount of sodium chloride, the salt intensity is within approximately 2 salt intensity points of the control salt, which represents a full amount of sodium chloride. As is shown in FIG. 8B, the salt intensity moves closer to the intensity of the control salt when half of the sodium chloride removed is replaced with potassium chloride. Further illustrated in FIG. 8C, the salt intensity as measured by a trained taste panel for a reduced salt amount closely resembles that for a control salt when all of the sodium chloride removed is replaced with potassium chloride. In FIGS. 8A through 8C, even with a 30% reduction in the amount of sodium chloride, utilization of a sodium chloride mean particle size less than 20 microns results in a salt perception within two salt intensity points of the control salt.

Figure 9C:
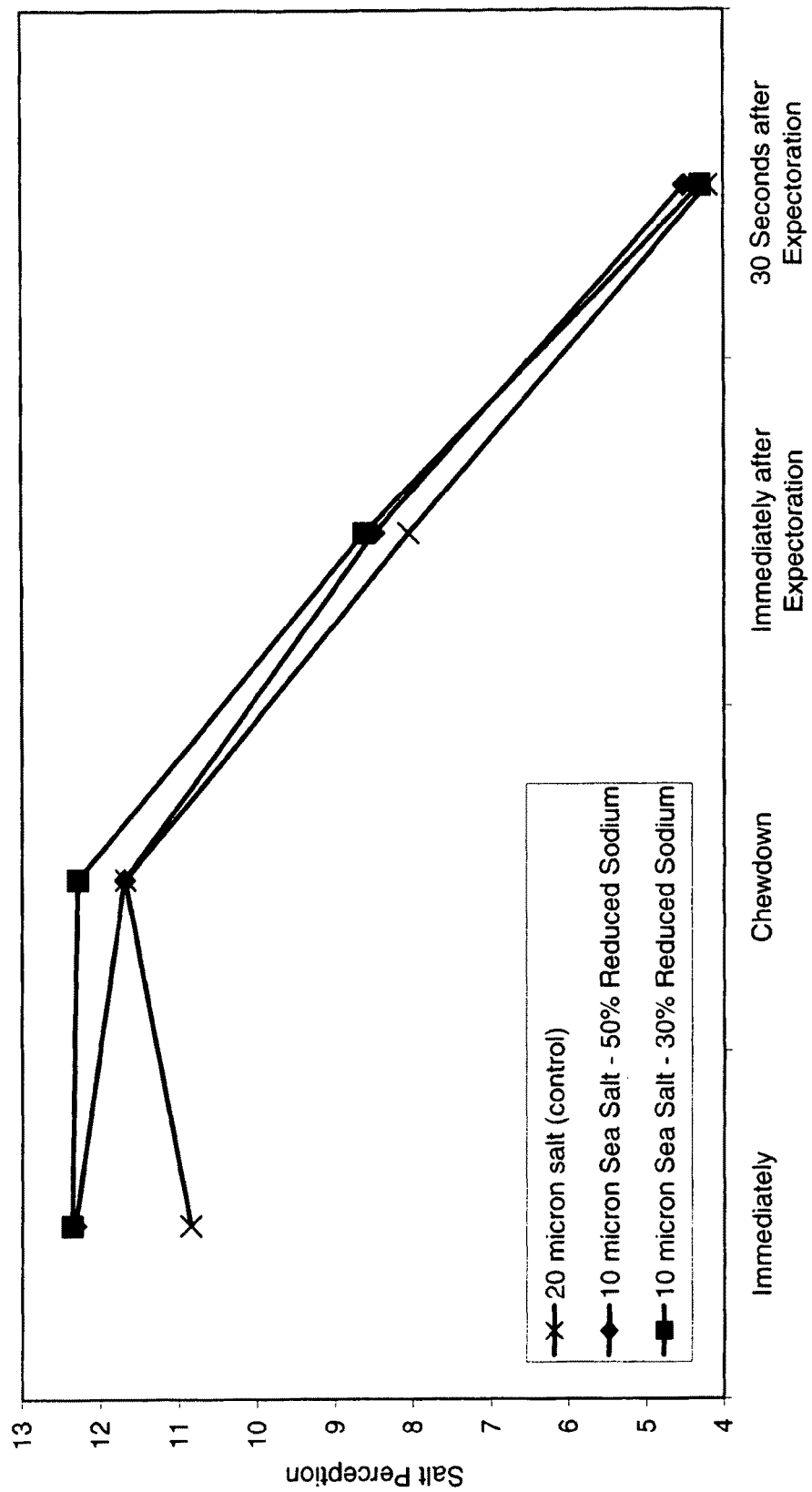
FIG. 9C is a graph illustrating the effect of ten micron sea salt on the intensity of salt perception after four predetermined times.

Taste tests have further shown that when the sodium chloride removed is replaced with potassium chloride, the salt perception measured by a trained taste panel is often greater than or within one salt intensity point of the control salt. Illustrated in FIG. 9A, almost every measurement of salt perception with sodium chloride replaced by an equal amount of potassium chloride resulted in a salt perception within one salt perception point of the control salt. Similar results are illustrated in FIG. 9B with one-and-a-half times the amount of salt removed replaced with potassium chloride. Additionally, FIG. 9C illustrates that similar results may be obtained using sea salt showing that even with a 30 and 50% reduction in sodium levels, sea salt delivers a greater salt perception than the control salt.

Figure 10A:
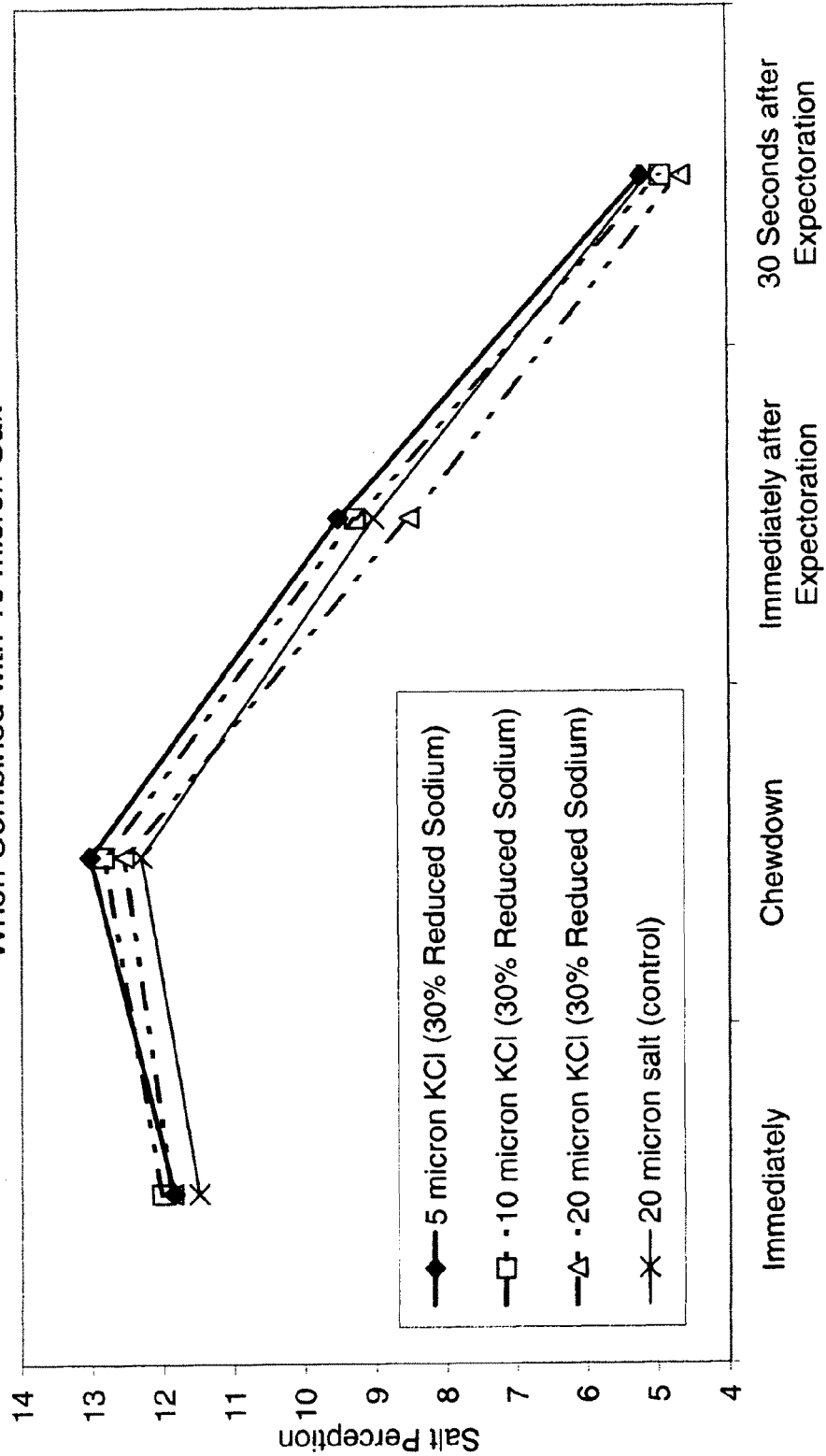
FIG. 10A is a graph illustrating the effect of potassium chloride particle salt when combined with ten micron salt compared to a control salt at four predetermined times.
Figure 10B:
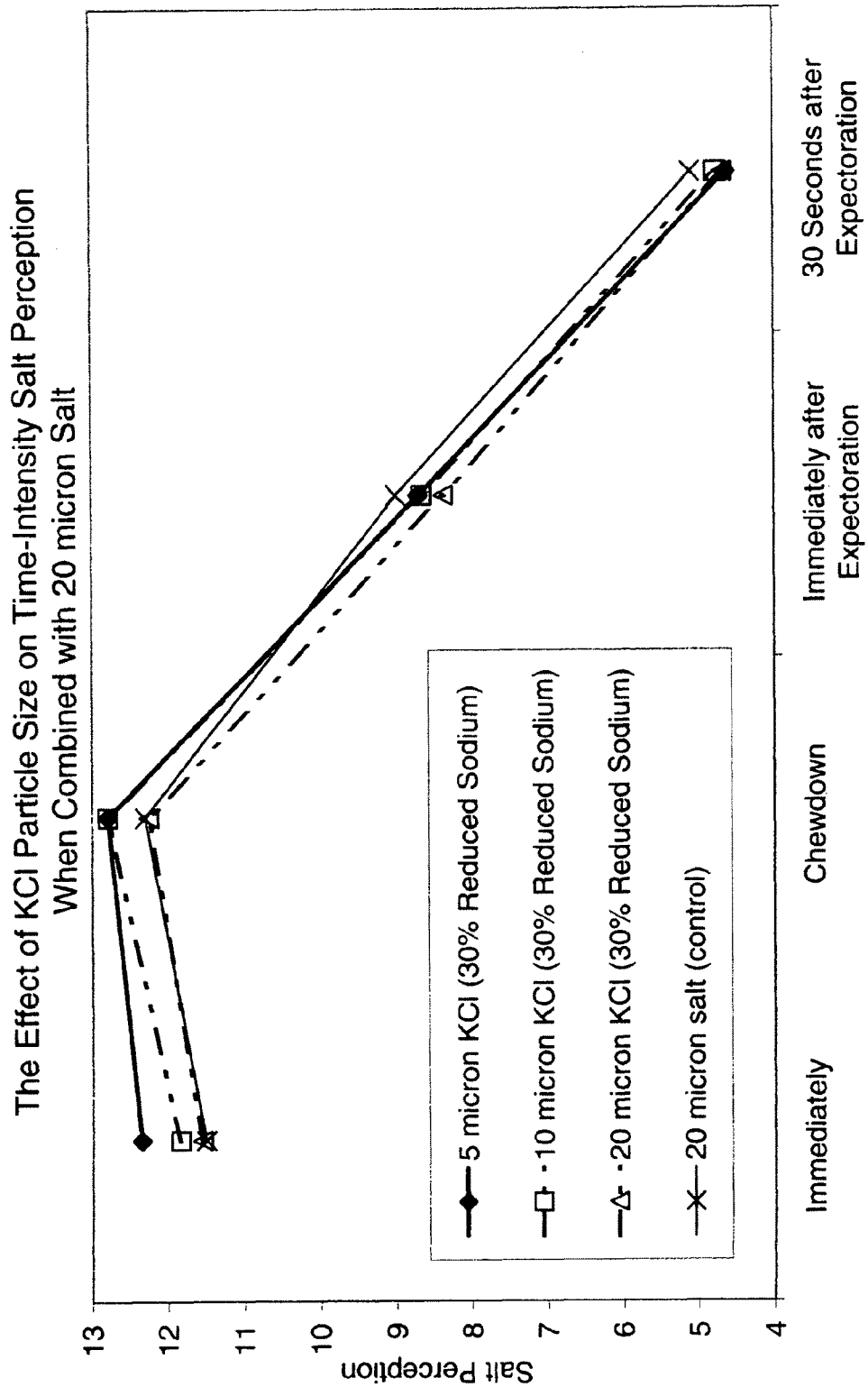
FIG. 10B is a graph illustrating the effect of potassium chloride particle salt when combined with twenty micron salt compared to a control salt at four predetermined times.

Further, a smaller particle potassium chloride is generally more effective for maintaining salt perception than larger particle potassium chloride when combined with a reduced amount of sodium chloride. As illustrated in FIG. 10A, five micron potassium chloride is generally more effective when combined with ten micron salt, although all sizes of potassium chloride deliver a salt perception within one point of the 20 micron control salt. Similar results are shown in FIG. 10B with different mean particle sizes of potassium chloride being combined with 20 micron salt. Generally, smaller sized particle sodium chloride, alone and when combined with varying sizes of potassium chloride, deliver a greater salt perception than sodium chloride with a mean particle size greater than 20 microns.

Additionally, potassium chloride was tested for bitterness intensity. Similar to the taste tests previously discussed, the methodology of each taste test utilizing potassium chloride was strictly followed to ensure consistent results. There was no indication in the results of the potassium chloride taste test for bitterness intensity that a reduction in potassium chloride mean particle size affected bitterness intensity.

2. Consumer Tests

The positive effect of seasoning 20 microns or less, including sodium chloride, potassium chloride, sea salt, and combinations thereof were tested on consumers. The methodology and results of the test are discussed below.

A total of one hundred and fifty two consumers in Wayne, N.J. were recruited to participate in the Low Fat Butter microwave popcorn comparison taste tests. The panelists were recruited from those who purchase and consume light or low fat microwave popcorn at least twice every month. Additionally, panelists had no food allergies and no one in their immediate family worked for a food company, in advertising, and/or for a market research company. Panelists were between the ages of 18-45 years of age (80% female; 20% male) and had not participated in a taste test within the last two months. Products were prepared as instructed on the bag. Multiple microwaves were used in the preparation of the product and samples were rotated evenly among the microwaves used. Each panelist tasted and consumed 4 samples of Low Fat Butter microwave popcorn. Serving orders were randomized and balanced for order and position effects. A sequential monadic serving procedure was used. A computerized ballot using Compusense® testing software was used for the collection of responses. A total of four questions were asked with two regarding whether the product was liked and two regarding flavor intensity. A 9-point anchored hedonic scale was used for the liking questions and a 10-point intensity scale was used for the flavor intensity questions. Results were analyzed using SAS Statistical software for the Analysis of Variance. A 90% confidence level was used to determine significant statistical difference between samples. Table 2 illustrates that a 30% reduction in sodium, when combined with various sizes and amounts of potassium chloride, is more effective the smaller the size of sodium chloride utilized when used with low fat butter flavored popcorn.

TABLE 2

Mean Liking and Flavor Intensity Scores of Low Fat Butter Flavored Popcorn Made With Small Particle Salt.

|  | Control 20 μm Salt | 30% Less Sodium 10 μm Salt + 10 μm KCl @ 1.25* | 30% Less Sodium 15 μm Salt + 10 μm KCl @ 1.0* | 30% Less Sodium 10 μm Salt + 10 μm KCl @ 1.0* | 30% Less Sodium 20 μm Salt + 20 μm KCl @ 1.0* |
|---|---|---|---|---|---|
| Overall Liking (9 pt) | 6.6 ab | 6.7 a | 6.4 ab | 6.3 ab | 6.2 b |
| Flavor Liking (9 pt) | 6.6 a | 6.5 ab | 6.4 ab | 6.2 ab | 6.1 b |
| Butter Flavor Intensity (10 pt) | 4.3 ab | 4.6 a | 4.1 b | 4.2 ab | 3.9 b |
| Saltiness Intensity (10 pt) | 3.9 b | 4.6 a | 3.9 b | 4.0 b | 3.5 b |

Means having different letters are significantly different at alpha = 0.1.
N = 152.
For Hedonic measures: A 9-point hedonic scale was used (ranging from 1 = dislike extremely to 9 = like extremely).
For Intensity measures: A 10-cm line scale was used. Intensity scales measure the degree to which consumers rate products as different or not different in amount or intensity of specific attributes. It does not indicate liking.
*KCl amounts defined as the ratio of KCl added/NaCl removed.

A total of one hundred and two consumers in Chicago, Ill. were recruited to participate in the Movie Theater Butter microwave popcorn comparison taste tests. The panelists were recruited from those who purchase and consume Movie Theater Butter Flavor Microwave Popcorn at least twice every month. Additionally, panelists had no food allergies and no one in their immediate family worked for a food company, in advertising, and/or for a market research company. Panelists were between the ages of 18-55 years of age (79% female; 21% male) and had not participated in a taste test within the last two months. Products were prepared as instructed on the bag. Multiple microwaves were used in the preparation of the product and samples were rotated evenly among the microwaves used. Each panelist tasted and consumed 4 samples of Movie Theater Butter Flavor microwave popcorn. Serving orders were randomized and balanced for order and position effects. A sequential monadic serving procedure was used. A computerized ballot using Compusense® testing software was used for the collection of responses. A total of six questions were asked with four regarding whether the product was liked and two regarding flavor intensity. A 9-point anchored hedonic scale was used for the liking questions and a 10-point intensity scale was used for the flavor intensity questions. Results were analyzed using SAS Statistical software for the Analysis of Variance. A 90% confidence level was used to determine significant statistical difference between samples. Table 3 illustrates that a 30% reduction in sodium, when combined with various sizes and amounts of potassium chloride, is more effective the smaller the size of sodium chloride utilized when used with movie theatre butter flavored microwave popcorn.

TABLE 3

Mean Liking and Flavor Intensity Scores of Movie Theatre Butter Flavored Microwave Popcorn Made With Small Particle Salt

| | Control 20 μm Salt | 30% Less Sodium 15 μm Salt + 10 μm KCl @ 1.0* | 30% Less Sodium 20 μm Salt + 20 μm KCl @ 1.0* | 30% Less Sodium 10 μm Salt + 10 μm KCl @ 1.25* |
|---|---|---|---|---|
| Overall Liking (9 pt) | 7.4 a | 7.2 ab | 7.0 b | 6.9 b |
| Flavor Liking (9 pt) | 7.3 a | 7.1 ab | 6.8 b | 6.8 b |
| Butter Flavor Liking (9 pt) | 7.2 a | 6.9 a | 6.8 a | 6.7 a |
| Saltiness Liking (9 pt) | 7.0 a | 6.7 ab | 6.2 b | 6.2 b |
| Butter Flavor Intensity (10 pt) | 6.5 a | 6.0 ab | 6.2 ab | 5.8 b |
| Saltiness Intensity (10 pt) | 5.5 ab | 5.1 bc | 4.5 c | 5.8 a |

Means having different letters are significantly different at alpha = 0.1.
N = 102.
For Hedonic measures: A 9-point hedonic scale was used (ranging from 1 = dislike extremely to 9 = like extremely).
For Intensity measures: A 10-cm line scale was used. Intensity scales measure the degree to which consumers rate products as different or not different in amount or intensity of specific attributes. It does not indicate liking.
*KCl amounts defined as the ratio of KCl added/NaCl removed.

A total of one hundred consumers in Chicago, Ill. were recruited to participate in the Butter flavor microwave popcorn comparison taste tests. The panelists were recruited from those who purchase and consume Butter Flavor Microwave Popcorn at least twice every month. Additionally, panelists had no food allergies and no one in their immediate family worked for a food company, in advertising, and/or for a market research company. Panelists were between the ages of 18-55 years of age (78% female; 22% male) and had not participated in a taste test within the last two months. Products were prepared as instructed on the bag. Multiple microwaves were used in the preparation of the product and samples were rotated evenly among the microwaves used. Each panelist tasted and consumed 4 samples of Butter Flavor microwave popcorn. Serving orders were randomized and balanced for order and position effects. A sequential monadic serving procedure was used. A computerized ballot using Compusense® testing software was used for the collection of responses. A total of six questions were asked with four regarding whether the product was liked and two regarding flavor intensity. A 9-point anchored hedonic scale was used for the liking questions and a 10-point intensity scale was used for the flavor intensity questions. Results were analyzed using SAS Statistical software for the Analysis of Variance. A 90% confidence Level was used to determine significant statistical difference between samples. Table 4 illustrates that a 30-50% reduction in sodium, when combined with various sizes and amounts of sea salt, is more effective the smaller the size of sodium chloride utilized when used with butter flavored popcorn.

TABLE 4

Mean Liking and Flavor Intensity Scores of Butter Flavored Microwave Popcorn Made With Small Particle Sea Salt

| | Control 20 μm Salt | 30% Less Sodium 10 μm Sea Salt | 30% Less Sodium 10 μm Sea Salt + 20 μm Salt Blend* | 50% Less Sodium 10 μm Sea Salt |
|---|---|---|---|---|
| Overall Liking (9 pt) | 7.2 a | 6.5 b | 6.9 ab | 6.8 ab |
| Flavor Liking (9 pt) | 7.2 a | 6.4 b | 6.7 ab | 6.8 ab |
| Butter Flavor Liking (9 pt) | 7.0 a | 6.4 b | 6.5 ab | 6.7 ab |
| Saltiness Liking (9 pt) | 6.6 a | 5.7 b | 6.3 a | 6.2 ab |
| Butter Flavor Intensity (10 pt) | 6.5 a | 5.4 b | 5.9 ab | 5.8 b |
| Saltiness Intensity (10 pt) | 5.3 b | 7.0 a | 6.0 b | 5.5 b |

Means having different letters are significantly different at alpha = 0.1
N = 100
For Hedonic measures: A 9-point hedonic scale was used (ranging from 1 = dislike extremely to 9 = like extremely).
For Intensity measures: A 10-cm line scale was used. Intensity scales measure the degree to which consumers rate products as different or not different in amount or intensity of specific attributes. It does not indicate liking.
*2:1 10 μm Sea Salt to 20 μm Salt ratio III. Embodiments of the Invention Referring generally to FIGS. 1 through 10B, a seasoning for at least one of flavoring and preserving a food product is described in accordance with exemplary embodiments of the present invention. The present invention includes compositions useful in the seasoning arts, food products seasoned in accordance with the compositions of the present invention, and methods for enhancing and potentiating food flavors by utilizing the compositions of the present invention.

A. Seasoning Compositions

In a first embodiment of a seasoning composition of the present invention, a seasoning consisting essentially of salt having a mean particle size of between five and 20 microns, is described. It will be appreciated by those of reasonable skill in the art, that the salt may be particles containing other ingredients, as part of a process of collection or manufacture, such as from mining, evaporation, and the like. However, it is generally conceived and comprehended that such salt will include essentially sodium chloride (NaCl) molecules.

For instance, the food product may include seasoned snack foods, such as peanuts, pretzels, popcorn, and potato chips; meat products, such as beef, pork, and poultry; cheese products in liquid, solid, and semi-solid states, and the like. In a specific embodiment, the food product is a charge of popcorn kernels disposed within a bag configured for microwave cooking. Thus, in this embodiment, the seasoning may be introduced to the food product before the food product is in a ready to eat state, such as before microwave cooking. Additionally, the seasoning may be introduced after the food product is cooked, much like how table salt (i.e., sodium chloride) is frequently used.

The overall salt component of the food product may be comprised of any salt fit for human consumption, preferably microfine sodium chloride, or "salt", microfine natural sea salts or sea salt blends, alone or in various combinations with microfine potassium chloride. Microfine salt, natural sea salts, or sea salt blends may have a mean particle size between 5 and 20 microns when determined by Malvern Laser Particle Size Analysis, preferably 10 microns. The particle size distribution curve may display a d90-value of less than 75 microns, preferably less than 25 microns. Potassium chloride may have a mean particle size between 5 and 150 microns when determined by the aforementioned method of analysis, preferably 10 microns. The particle size distribution curve may display a d90-value of less than 200 microns, preferably less than 25 microns.

The overall salt component of the food product may be comprised entirely of microfine salt, microfine natural sea salts, or sea salt blends alone to improve the salty flavor of the food product while reducing the amount of sodium. The addition of microfine potassium chloride to the salt component of the food product may complement and improve the desired salty flavor while maintaining a reduction in sodium content. Small particle potassium chloride may be a component of the overall salt component at a value of 5% to 75%, by weight, preferably 30 to 40% when a bitter masking agent is included, such as trehalose, neotame, or other ingredients used for this purpose. Higher percentages of potassium chloride may be used when a bitter masking agent is included. Additionally, a bulking agent, such as starch, maltodextrin, dextrose, other starch derivatives, or other suitable bulking agents, which will not adversely affect the flavor or organoleptic properties of the salt seasoning component, may be added as needed.

In another embodiment, sea salt is utilized as a seasoning on a food product. Sea salt may contain sodium chloride, potassium chloride, magnesium, calcium, sulfates, and/or other constituents. Sea salt also includes both natural and manufactured or man-made salt. Natural sea salt is generally sea salt procured from seawater utilizing the natural processes of drying and evaporating by the sun and wind and gathered by hand. Manufactured or man-made salt is generally harvested utilizing machinery or produced using other non-natural techniques. The taste of sea salt often depends on the source. Sources of sea salt may include Cape Cod, the Cayman Islands, France, Ireland, Italy, and Hawaii, as well as many other locations. The flavor, mouthfeel, and color may vary from each source and is advantageous to a consumer base with differing tastes. Preferably, the sea salt has a mean particle size between 5 and 20 microns.

In one embodiment, the present invention is a seasoning for at least one of flavoring and preserving a food product, comprising a first seasoning component including a salt and a second seasoning component selected for at least one of complementing the first seasoning component and reducing the amount of the first seasoning component required for producing a desired flavor of the food product. For instance, the desired flavor may be a true salty flavor, such as from sodium chloride. The first seasoning component and the second seasoning component have a mean particle size of less than 20 microns. In another embodiment, the first seasoning component has mean particle size between five and 20 microns, and the second seasoning component has a mean particle size of greater than or equal to 20 microns.

In another embodiment, the first seasoning component includes at least one of sodium chloride and potassium chloride. For example, in one specific embodiment, the first seasoning component is sodium chloride having a mean particle size such that when included with the second seasoning component, the mean particle size of each seasoning is less than 20 microns. The food seasoning may further comprise a second seasoning component selected for complementing the taste impact of the first seasoning component and/or reducing the amount of the first seasoning component required for producing the desired taste impact. In this embodiment, the second seasoning component includes potassium chloride, a bulking agent, and/or a bitterness masking agent. For example, in another specific embodiment, the second seasoning component is potassium chloride, which may additionally include a bitterness masking agent commonly used in the art. The bitterness masking agent may be any additive commonly used in the art to at least one of mask, inhibit, and mitigate the bitter sensation associated with potassium chloride. An exemplary bitterness masking agent is trehalose, as disclosed in U.S. Patent Publication No. 2006/0088649 and U.S. Pat. No. 6,159,529. While only sodium chloride elicits a true salt taste, it is foreseeable that an amount of potassium chloride may be used to complement the flavor of sodium chloride, while reducing the dietary intake of sodium. Because the potassium chloride may impart a bitter flavor to the mixture, however, a bitterness masking agent may be utilized to mitigate this bitter sensation as needed.

As described above, the second seasoning component may include a bulking agent. The bulking agent may be utilized to further reduce the amount of the first seasoning component required to impart the desired flavor. The bulking agent may comprise starch, maltodextrin, dextrose, other starch derivatives, or other suitable bulking agents which should not adversely affect the flavor and organoleptic properties of the first seasoning component. The bulking agent may further be necessary when applied to a surface with moisture for minimizing salt dissociation.

In an additional embodiment, a first seasoning component is delivered to the product in a non-aqueous suspension. In a specific embodiment, the first seasoning component is sodium chloride comprising a mean particle size such that when included in the non-aqueous suspension the mean particle size is less than 20 microns, and the non-aqueous suspension is cooking oil. The sodium chloride in the cooking oil may be sprayed onto a food product such as ready-to-eat popcorn or chicken dinners. Additionally, the non-aqueous suspension may include seasoned oil, butter, margarine, and other non-aqueous suspensions as required. A non-aqueous suspension is necessary to prevent the sodium chloride from dissolving and becoming less concentrated. When the sodium chloride particle dissociates, the concentration is lessened because the same volume of sodium chloride in the particle is dispersed into a larger volume of solvent. Therefore, it is important that the sodium chloride or first seasoning component not dissociate because the flavor impact depends on the concentration. Another example of a non-aqueous suspension may include a cookware release composition suitable for dispensing from an aerosol container.

In another embodiment, a seasoning is be applied to a product using adhesion. In a specific embodiment, a coating, such as cooking oil, butter, or a non-nutritive oil, is first applied to a food, possibly through an aerosol spray. Sodium chloride, which is the first seasoning, may then be applied to the coating. Alternatively, the sodium chloride, with a mean particle size less than 20 microns, may be included in the aerosol spray. The sodium chloride may be delivered as a suspension not only in cooking oil, but also in alcohol or some other non-polar solvent. One serving amount of sodium chloride from a salt shaker may contain approximately 1500 to 2000 mg of sodium chloride, while one serving amount of a sodium chloride suspension applied as an aerosol may contain approximately 300 to 400 mg of sodium chloride. It is necessary that the coating be non-aqueous so that the sodium chloride does not dissociate. Dissociation of the sodium chloride reduces the seasoning concentration, which in turn reduces the flavor impact. If sodium chloride is applied to a food with an aqueous surface, soy oil, maltodextrin, or other seasonings or ingredients may be utilized to prevent the sodium chloride from dissociating.

In another embodiment, a seasoning of salt, having a mean particle size less than 20 microns, is surrounded, or encapsulated, by a non-aqueous coating. For example, a particle of sodium chloride less than 20 microns may be encapsulated by cooking oil or fat. When applied to a surface with aqueous properties, the layer of cooking oil or fat prevents the salt from dissociating and preserves the concentration of the salt particle as a tastant. During consumption, the oil or fat layer is ruptured and the salt is available for use.

In a further embodiment, the first seasoning component is deposited at least partially around the second seasoning component. Deposition may occur via high shear granulation; fluid bed coating; spray drying; coacervation; physical vapor deposition, including plasma deposition and sputtering; chemical vapor deposition; or another suitable deposition technique. The second seasoning component may be fully encapsulated by the first seasoning component, or in the alternative, only a portion of the second seasoning component surface area is covered by the first seasoning component. For example, in a seasoning particle, starch may act as a core component upon which sodium chloride is deposited. While sodium chloride is located around the perimeter of the seasoning particle, saliva may quickly dissolve the salt into solution so that it may be tasted. Since starch comprises the core of the seasoning particle in this embodiment, less sodium chloride is ingested per seasoning particle compared to a seasoning particle solely comprised of sodium chloride. Even though the core may not impart a salty flavor, the rapid dissolution of the salt may result in a relatively high perceived salt taste. Alternatively, starch and sodium chloride may be admixed or agglomerated into a discrete particle. In this manner, the saltiness perception may be lengthened or extended due to a separation of sodium chloride units by the starch. Rather than a rapid dissolution, the sodium chloride may be dissolved upon agglomeration or admixture break-up, resulting in a lengthened dissolution process and a longer lasting sodium chloride taste.

In a similar embodiment, sodium chloride less than 20 microns in size acts as the core component while cooking oil or fat is deposited on the surface of the sodium chloride. This is useful when the seasoning is to be deposited on an aqueous or partial aqueous surface. The cooking oil or fat layer on the perimeter of the sodium chloride may prevent the sodium chloride from dissociating on the aqueous surface and in turn maintaining the concentration of the seasoning, which acts as a flavor potentiator and enhancer. The outer perimeter may be ruptured during the chewing process and the sodium chloride may be available to the taste buds in concentrated form for flavor potentiation and enhancement. In a specific embodiment, cooking oil is deposited on the surface of a sodium chloride particle, and dispersed on a meat product, which has an aqueous layer on its surface upon which the cooking oil or fat layer prevents the sodium chloride from dissociating. Because the sodium chloride does not dissociate and remains more concentrated, the flavor of the turkey is potentiated and enhanced and the same flavor impact requires less sodium chloride.

It is also foreseeable that sodium chloride particle structures other than a cubic crystal lattice may be utilized in the present invention. For example, dendritic salt or salt produced from the Alberger process may be used. Dendritic salt may be produced in vacuum pans from chemically purified brine to which a crystal modifying agent is added. The resultant crystals are porous, star-shaped modified cubes. This structure ensures an even greater solvent exposed area, and thus better solubility than regular cubic crystalline structure. The Alberger process produces salt through mechanical evaporation and may use an open evaporating pan and steam energy. The resultant crystals are stairstep-like flakes with very low bulk density. This structure increases the solvent exposed area, and thus, has better solubility characteristics than regular cubic crystalline structure. Smaller amounts of these salt forms may be required than traditional amounts of salt to obtain the desired taste, due to the high solubility of is these specialized forms. Additionally, the irregular shapes of these salt forms may enhance their ability to cling to surfaces, such as on food products. The salt utilized may be obtained from direct mining, solar evaporation of natural brines, and mechanical evaporation of artificial brines. Mechanical evaporation may occur in vacuum or in open-pan crystallizers.

The charge of seasoning may include sodium chloride and/or potassium chloride. In one specific embodiment, the charge of seasoning is sodium chloride with a mean particle size of less than 20 microns. Alternatively, the charge of seasoning may include sodium chloride, potassium chloride, and a bitterness masking agent, the combination of which may consist of mean particle sizes less than 20 microns. Additionally, the charge of seasoning may include a bulking agent, such as starch or a starch derivative, to further decrease the amount of dietary sodium in the microwave popcorn product. The charge of seasoning may comprise an admixture, core and coating, agglomeration, or other configuration of particles. By utilizing a small mean particle size with or without combination of other sodium reducing components, a desired salty taste perception is attained in a microwave popcorn product having reduced sodium content. Other examples of seasoning may include sodium chloride and/or potassium chloride containing salts, such as sea salts (e.g., natural or manufactured sea salts) and other variously flavored salts and flavorings.

In another embodiment, a seasoning of salt, having a mean particle size less than 20 microns, is surrounded, or encapsulated, by a non-aqueous coating. For example, a particle of sodium chloride less than 20 microns may be encapsulated by cooking oil or fat. When applied to a surface with aqueous properties, the layer of cooking oil or fat prevents the salt from dissociating and preserves the concentration of the salt particle as a tastant. During consumption, the oil or fat layer is ruptured and the salt is available for use.

In another embodiment, a seasoning including salt, having a mean particle size less than 20 microns, is delivered to a food product by a vacuum brine system. For example, sunflower seeds may be placed in a container that suctions out the air. A suspension of sodium chloride particles less than 20 microns in a non-aqueous material is introduced into the container with the seeds. The vacuum causes the salt suspension to enter the shell and season the sunflower seed.

B. Popcorn Embodiments

In an additional embodiment, a microwave popcorn product is disclosed. The microwave popcorn product includes a charge of popcorn kernels, a charge of seasoning for flavoring the charge of popcorn kernels, and a bag for containing the charge of popcorn kernels and the charge of seasoning, wherein the charge of seasoning has a mean particle size of less than 20 microns. The microwave popcorn product also may include an edible oil, fat, or adhesive configured to adhere the charge of seasoning to the charge of popcorn kernels. Additionally, the edible oil or fat may cover popped popcorn kernels such that the charge of seasoning adheres to the popcorn during microwave cooking. Alternatively, the charge of seasoning may be deposited onto the charge of popcorn kernels prior to microwave cooking. Deposition of the charge of seasoning may replace the need for an adhesive prior to microwave cooking, since deposition methods result in direct adherence of the charge of seasoning to the charge of popcorn kernels.

In yet another embodiment, a seasoning of sodium chloride, having a mean particle size greater than or equal to 5 microns and less than or equal to twenty microns, is utilized for seasoning a popcorn product that is 94% fat free. The seasoning may further include potassium chloride, bitterness maskers, bulking agents, and flavorings and colorings as required. Additionally, the seasoning of sodium chloride may be utilized on other fat free or reduced fat products as required, including microwave popcorn. The range of reduced fat may be significantly lower than 94%, such as 50%, without departing from the scope and spirit of the invention.

The charge of seasoning discussed in the previous paragraph may include sodium chloride and/or potassium chloride. In one specific embodiment, the charge of seasoning is sodium chloride with a mean particle size of less than 20 microns. In an alternative embodiment, the charge of seasoning includes sodium chloride, potassium chloride, and a bitterness masking agent with the sodium chloride having a mean particle size less than 20 microns. Additionally, the charge of seasoning may include a bulking agent, such as starch or a starch derivative, to further decrease the amount of sodium in the microwave popcorn product. The charge of seasoning may comprise an admixture, core and coating, agglomeration, or other configuration of particles. By using a small mean particle size with or without combination of other sodium reducing components, a desired enhancement of the popcorn flavor is attained in a microwave popcorn product having reduced sodium content. Additional examples of seasoning may include sodium chloride and/or potassium chloride combined with other salts, such as natural or manufactured sea salts and other variously flavored salts and flavorings.

In yet another embodiment, the microwave popcorn charge of seasoning comprises a water/oil emulsion. For example, the seasoning may be included as a component of a stable water/oil emulsion, and upon heating in a microwave oven or similar cooking device, the water at least partially vaporizes. In a specific embodiment, a sodium chloride saline solution is emulsified with a cooking oil commonly used in the art, such as palm oil, for example. Upon heating the water element vaporizes and sodium chloride is deposited onto both popped and unpopped popcorn kernels via the steam. The cooking oil may provide adequate adhesion characteristics to the kernels for deposition of the seasoning. In another embodiment, sodium chloride, having a mean particle size less than 20 microns, is emulsified with a cooking oil and applied as an aerosol to a final food product such as pizza crust, french fries, ready-to-eat popcorn and the like.

In one embodiment, a microwaveable popcorn product is seasoned utilizing seasoning with a mean particle size less than 20 microns. In general the product includes a closed microwave popcorn package, such as a tub or bag. Unpopped popcorn kernels and a slurry are placed inside the package. The term "slurry" as used herein, unless otherwise stated, is meant to describe all food components included within the package not including the unpopped popcorn kernels. A typical component in a microwave popcorn slurry is an oil/fat material. The oil/fat material generally has a melting point (Mettler drop point) of at least 90° F. (32° C.) and preferably not greater than 145° F. (62.8° C.). Typically, the Mettler drop point for the oil/fat material is at least 95° F. (35° C.) and preferably not greater than 140° F. (60° C.). Usually the Mettler drop point is within the range of 100°-135° F. (37.8°-57.2° C.), often at least 110° F. Current preferred oil/fat materials often have Mettler drop points between 110° F.-135° F. (43.3°-57.2° C.). Some examples according to the descriptions herein may have Mettler drop points no greater than 130° F. (54.4° C.). The slurry may include a variety of materials in addition to the oil/fat material. It may include salt, sweetener, various flavorants, antioxidants, lecithin and/or coloring.

The oil component is preferably in the form of a slurry at elevated temperatures, e.g., around 120° C. and generally in a solid form at room temperature. Oils suitable for use in the present invention include partially hydrogenated oils, such vegetable oil, sunflower oil, safflower oil, rapeseed oil, low erucic acid rapeseed oil, cottonseed oil, maize oil, linseed oil, varieties of high oleic acid residue, groundnut oil, and/or other mixtures. The oil component enhances the flavor of the microwaved popcorn product. If desired, the oil component may include an artificial sweetener. A particularly preferred composition for the oil component comprises partially hydrogenated soybean oil, salt, color, butter flavor and sucralose.

The oil/fat material may comprise a mixture of oil/fat components, having the overall Mettler drop points discussed above. The oil/fat material may include a first oil/fat component comprising at least 32% by weight of the oil/fat material, typically at least 80% by weight of the oil/fat material and usually at least 90% by weight of the oil/fat material. The first oil/fat component may be present within the microwaveable popcorn package at least 3% by weight of the unpopped popcorn kernels, more preferably at least 8% by weight of the unpopped popcorn kernels and typically and preferably at least 10% by weight of the unpopped popcorn kernels. Typical applications will involve use of the first oil/fat component in the slurry at a level corresponding to 20%-70% by weight of the unpopped popcorn kernels.

The oil component may further include a flavoring agent and/or a coloring agent. Suitable flavoring agents may include natural and artificial flavors, such as synthetic flavor oils and flavoring aromatics and/or oils, oleoresins and extracts derived from plants, leaves, flowers, fruits, and so forth, and combinations thereof. Particularly useful flavorings include artificial, natural and synthetic fruit flavors such as vanilla, citrus oils including lemon, orange, lime, grapefruit, and fruit essences including apple, pear, peach, grape, strawberry, raspberry, cherry, plum, pineapple, and apricot. The flavoring agents may be in liquid or solid form. Commonly used flavors include mints such as peppermint, menthol, artificial vanilla, cinnamon derivatives, and various fruit favors. Other flavorings that may be used include aldehyde flavorings, such as acetaldehyde (apple), benzaldehyde (cherry, almond), anisic aldehyde (licorice, anise), cinnamic aldehyde (cinnamon), citral, i.e., alpha-citral (lemon, time), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethylbutyeraldehyde (berry fruits), hexenel, i.e., trans-2 (berry fruits), tolyl aldehyde (cherry, almond), veratraldehyde (vanilla), 2,6-dimethyl-5-heptanal, i.e., melonal (melon), 2,6-dimethyloctanal (green fruit), and 2-dodecenal (citrus, mandarin), cherry, grape, strawberry shortcake, and similar flavorings. Preferred flavoring agents include butter, brown sugar, caramel, cooked milk, maple, vanilla, cream, pastry, marshmallow, cheese, cinnamon, and honey. Other examples of suitable flavoring agents are described in S. Arctander, Perfume and Flavor Chemicals (1969) and Allure Publishing Corporation's Flavor and Fragrance Materials (1993), the disclosures of which are incorporated herein by reference. In general, the amount of flavoring agent used should be in an amount effective to provide the desired or acceptable taste to the consumer.

Coloring agents may be included in an amount up to about 10% by weight, preferably no more than about 6% by weight, of the microwaveable popcorn composition. Suitable coloring agents may include natural food colors and dyes suitable for food, drug and cosmetic applications, which are preferably oil-dispersible, including the indigoid dye known as F.D. & C. Blue No. 2, the disodium salt of 5,5-indigotindisulfonic acid), and the dye known as F.D. & C. Green No. 1, the monosodium salt of 4-[4-(N-ethyl-p-sulfoniumbenzylamino) diphenylmethylene]-[1-(N-ethyl-N-p-sulfoniumbenzyl)-delta-2,5-cyclohexadi-eneimine.

The oil component preferably also includes salt. Any suitable type of salt can be used, including coarse, fine, extra fine salt, and salt less than 20 microns in size. The salt is preferably present in an amount up to about 10%, more preferably from about 0.5% to about 6% by weight, based on the total weight of the composition. However, because salt may increase burning of sugar, the precise amount of salt used may depend on the presence, size and shape of the susceptor, and amount of sugar utilized in the packaging, discussed further below.

Three general types of oil/fat components are described as usable for the first oil/fat component referenced in the previous paragraphs. The three general types are: certain types of oil blends including an interesterified oil component; selected physical melt blends of oils, typically with an emulsifier; and, selected physical palm oil melt blends.

With the three types of blends, the general objective is to develop a relatively stable first oil/fat material with respect to problematic levels of undesirable flow (wicking) within the microwaveable popcorn package or undesirable levels of flow from the microwaveable popcorn package despite the fact the first oil/fat material includes a substantial amount of an oil component with the characteristic of being relatively flowable or pourable under typical conditions of storage, such as room temperature. Low trans oils are typically liquid at room temperature, possibly with some solid content. If the low trans oils are not modified, the oils will tend to wick undesirably from the package during storage.

Two general approaches for managing wicking have been developed. First, referenced herein as "interesterified blends," the oil properties are modified through a chemical interesterification process to provide for a different Mettler drop point or melting point profile for the blended oil resulting in higher stability with respect to undesirable levels of wicking. Second, referring to selected physical oil blends and selected palm oil blends, a solid phase and liquid phase are melt blended together under conditions such that when the mixture is cooled, the solid phase reforms in a manner that defines a matrix for helping trap the liquid oil and inhibiting undesirable levels of wicking.

When the first oil/fat component includes an interesterified oil/fat material, it is generally an oil/fat resulting from an interesterification of a mixture including a first stearine component and an oil having a saturated fat content no greater than 50% and a Mettler drop point no greater than 110° F. (43.3° C.), typically no greater than 100° F. (37.8° C.). Typically this oil/fat resulting from interesterification comprises the result of interesterification of a mixture including at least 5%, and not more than 50% by weight, of a) the first stearine component, typically having a Mettler drop point of at least 130° F. (54.4° C.) and not greater than 170° F. (76.7° C.), usually not greater than 165° F. (73.9° C.), and b) an oil component having a saturated fat content no greater than 40% and a Mettler drop point no greater than 100° F. (37.8° C.). Typically, the oil used in interesterification has a saturated fat content no greater than 35% and a Mettler drop point no greater than 90° F. (32° C.). Often the oil used in the interesterification will be one which has a Mettler drop point of no greater than 70° F. (21° C.). In typical applications, the component resulting from interesterification comprises at least 10% and not more than 40% by weight of a first stearine component, and b) the oil component as defined. Typically the blend subjected to interesterification comprises 15% to 30% by weight stearine. The component resulting from interesterification, preferably the first stearine component, may be soybean stearine, cottonseed stearine, corn stearine, palm stearine and various mixtures of the components. Typically the component is soybean stearine. Additionally, the interesterification process may be a directed interesterification.

The first oil/fat component may be a result of an interesterification of a mixture of a non-hydrogenated oil and stearine component. Various techniques for interesterification, both chemical and enzymatic, are known and may be utilized in microwave popcorn applications. There is no preference with respect to whether a chemical or enzymatic so interesterification is used in the preferred embodiments discussed above.

Interesterification is a reaction that involves the exchange of acyl groups among triglycerides. The reaction may include the interchange of acyl groups between a fatty acid and a triacylglycerol (acidolysis), an alcohol and triacylglycerol (alcoholysis), and an ester with another ester, referred to as interesterification, ester interchange, proper esterification, rearrangement, or transesterification. During an interesterification process, fatty acids are rearranged both within triacylglycerol molecules (intramolecular) and between different molecules (intermolecular). The reaction is performed in order to modify the functional properties of lipids and not the specific fatty acids. Only the positions of fatty acid groups are changed, not their properties. Unsaturation levels remain the same and there is no cis-trans isomerization, such as that in hydrogenation. Interesterification may be used to change the physical melting and crystallization properties of lipids. The final resulting properties are dependent on the composition of the starting materials.

Interesterification may be performed using either a chemical or enzymatic catalyst. Alkaline catalysts, such as sodium methoxide, are generally preferred for chemical interesterification. Lipases are used as the catalyst for enzymatic interesterification. Lipases vary in their specificity. They may be specific according to the following: substrate, fatty acid, positional esters, and stereospecific (for example, random and sn-1,3specific). Most lipases preferentially hydrolyze at the 1- and 3-positions on the triglyceride, although some may react at all three positions. An example of an industrial application of this process is used in providing the NovaLipid™ line of oils supplied by Archer Daniels Midland (ADM), Decatur, Ill., in which an immobilized 1,3-specific lipase from *Thermoces languinosus*, named Lipozyme TL IM (Novozyme A/M Bagsvaerd, Denmark), is used as the catalyst (Reference: Cowan, D and TL Husum, Enzymatic Interesterification: Process Advantage and Product Benefits, *Inform*, March 2004, Vol 15(3), p. 150-151). Typically, an interesterified oil consistent with the parameters defined herein may be obtained by order from a food oil supplier such as ADM.

The oil component from which the interesterified oil is formed has a saturated fat content no greater than 50% (typically no greater than 40% and usually no greater than 30%), and b) a Mettler drop point of no greater than 110° F. (43.3° C.), typically no greater than 100° F. (37.7° C.), and usually no greater than 90° F. (32° C.). The oil component is typically and preferably selected from the group consisting essentially of soybean oil, canola oil, sunflower oil, corn oil, rapeseed oil, cottonseed oil, mid-oleic sunflower oil, safflower oil, one of the identified oils partially hydrogenated, or mixtures of one or more of the identified oils and/or one or more of the identified partially hydrogenated oils. Preferably, any partially hydrogenated oil that is used has an iodine value of at least 90. Most preferably this oil component, for use in interesterification, comprises soybean oil that has not been hydrogenated at all or which has an iodine value of at least 110, typically within the range of 120-145.

The first oil/fat component of the oil/fat in the slurry may comprise 100% of the result of the interesterification. However, in some instances, the first oil/fat component will comprise a mixture of the result of the interesterification and a second stearine component. When this type of mixture or blend is used as the first oil/fat component, preferably it is made with at least 1%, typically at least 2% and usually no more than 10% by weight of the second stearine component. Typically no more than 5% by weight of the second stearine is used, while the remainder comprises the result of the interesterification. The second stearine typically has a Mettler drop point of at least 130° F. (54.4° C.) and typically not greater than 170° F. (76.7° C.). Usually the Mettler drop point is no greater than 165° F. (73.9° C.). The second stearine is typically selected from the group consisting essentially of cottonseed stearine, soybean stearine, corn stearine, palm stearine, or mixtures thereof, usually soybean stearine. The first stearine component and the second stearine component may be independently selected. The same stearine may be used for both components if desired. The interesterified blends generally result in a microwave popcorn product including an oil/fat material with a relatively low trans content. The low trans content is a result of the oil/fat material being developed from oil material low in trans content, yet showing a melting point profile or Mettler drop point profile more acceptable for incorporation in package microwave popcorn products on a substantial basis with respect to storage stability and heat characteristics.

When the first oil/fat material is a physical oil blend, it is often a result of melt blending, with an overall saturated fat content no greater than 50%, preferably no greater than 44% and most preferably no greater than 38%, and an overall Mettler drop point no greater than 145° F. (62.8° C.), more preferably no greater than 140° F. (60° C.), and most preferably no greater than 135° F. (57.2° C.).

The physical oil blends typically result from melt blending a liquid oil component and a solid fat component. Typically the Mettler drop point of the blend is at least 100° F., usually at least 110° F. (43.3° C.), and often 115° F. (46.1° C.) or more. In one embodiment, a Mettler drop point of 125°-135° F. (51.7°-57.2° C.) may be obtained by melt blending corn oil (85% by wt.), soybean stearine (10% by wt.), and monoglycerides (5% by wt.).

The liquid oil component generally possesses liquid properties at room temperature. For example, it is pourable at room temperature (70° F. for 21.1° C.). Oils which meet this definition typically have either a solid fat content ("SFC") no greater than 30% at 70° F. (21.1° F.) and/or a Mettler drop point of no greater than 90° F. Although palm oil (palm fruit oil) does not necessarily meet both of these criteria, other liquid oils may. The liquid oil component generally has a Mettler drop point no greater than 106° F. (41.1° C.), typically no greater than 90° F. (32.2° C.), and often a Mettler drop point of (70° F. or 21.1° C.) or below.

The solid fat component usually exhibits the properties of a solid at room temperature. The solid fat component typically has a Mettler drop point of at least 130° F. (54.4° C.) and not more than 170° F. (76.7° C.). Usually it has a Mettler drop point no more than 165° F. (73.9° C.).

When the liquid oil component and solid fat component are melt blended together, an oil/fat material or blend results upon cooling, in which the solid fat material matrix helps retain the liquid material from undesirable levels of wicking from a microwave popcorn package.

The liquid oil component is often selected from the group consisting essentially of soybean oil, canola oil, sunflower oil, corn oil, rapeseed oil, cottonseed oil, safflower oil, partially hydrogenated oils, mixtures of one or more of the identified oils, mixtures of one or more of the partially hydrogenated oils, mixtures of one or more of the identified oils and/or identified hydrogenated oils, and/or mixtures of one or more of the identified oils and/or hydrogenated oil, optionally including up to 49%, by weight palm oil, sometimes called palm fruit oil. The liquid oil component may contain up to 49%, by weight palm oil, although in some instances it may be preferred to include no palm oil for nutritional reasons.

If partially hydrogenated oil is used for the oil component, it preferably has an iodine value of at least 90. Most preferably, the oil component includes an oil which contains less than 3% linolenic, such as cottonseed and/or corn oil that has not been hydrogenated, or which has an iodine value of at least 110, typically within the range of 120-145.

The solid fat component may be soybean stearine, cottonseed stearine, corn stearine, palm stearine, hydrogenated palm stearine, hydrogenated palm fruit oil, and mixtures thereof. The solid fat component is often soybean stearine.

In many instances, the melt blend will further include an additional mouth feel adjuvant for providing assistance with wicking control or flow of the liquid oil component and helping improve mouth feel of the resulting product. Materials for operating as adjuvants typically include materials solid at room temperature that may be melt blended. Preferably, the adjuvant material is not a triglyceride. Edible materials marketed as emulsifiers are often useable despite the fact they are not selected, at least with respect to the steps of melt blending, for their characteristics as emulsifiers. When present, this adjuvant is typically present at a level sufficient to provide an effective amount of improvement in mouth feel relative to its absence in the composition. Typically, this amount will be on the order of at least 0.5% by weight of the liquid oil component, solid fat component, and mouth feel adjuvant together in the melt blend. Usually this adjuvant will be present no more than 7% by weight of the melt blend (oil, solid fat component, and adjuvant component for improvement of mouth feel). A typical amount may be on the order of 1%-6% by weight. The mouth feel adjuvant is typically and preferably mono-glycerides, di-glycerides, mixtures of mono and di-glycerides, polyglycerol esters of fatty acids, partially hydrogenated monoglycerides, propyleneglycol esters of fatty acids, and mixtures thereof. Often, commercially available mixtures of fully hydrogenated mono-glycerides, usually sold as emulsifiers, may be used. When this type of mixture is melt blended for use in a packaged microwaveable popcorn product as the first oil/fat component, it is preferably made with at least 80% and no more than 95% by weight of the liquid oil component, at least 5% and no more than 15% by weight of the solid fat component, and, if present, 0.5%-7% by weight mouth feel adjuvant.

Selected palm oils blends may be utilized for providing satisfactory performance with respect to wicking characteristics in packaged microwave popcorn products. Palm oil blends are often higher in saturated fat than the other physical oil blends. If the first oil/fat component is a palm oil blend, it is often a palm oil blend having a saturated fat content no greater than 60% (preferably no greater than 55% and most preferably no greater than 53%), and a Mettler drop point of at least 100° F. (37.8° C.), typically at least 110° F. (43.3° C.) and no greater than 125° F. (51.7° C.), typically no greater than 120° F. (48.9° C.) and often no greater than 118° F. (47.8° C.).

The palm oil blend is often a melt blend of a first liquid palm oil component with a Mettler drop point no greater than 106° F. (41.1° C.) and a second solid palm oil/fat component having a Mettler drop point of at least 120° F. (48.9° C.), typically at least 130° F. (54.4° C.), and usually not greater than 145° F. (62.8° C.). The second, solid, palm oil/fat component is often selected from palm stearine, fractionated palm stearine, hydrogenated palm oil, or mixtures thereof. The second solid palm oil/fat component is typically palm stearine.

The first liquid palm oil component typically is selected from palm fruit oil (sometimes referred to as palm oil), palm olein, and mixtures thereof. Typically it comprises palm fruit oil. An oil/fat component made with palm oil is preferably made with at least 10% and no more than 60% by weight of the second solid palm oil/fat component, more preferably at least 15% and no more than 50% by weight, with the remainder 40% to 90%, typically 50%-85% by weight comprising the first liquid palm oil component as defined. The typical preferred melt blends of the second solid palm oil/fat component and first liquid palm oil component may yield a Mettler Drop Point of between 110° F. (43.3° C.) to 120° F. (48.9° C.) with a saturated fat level between 60% and 50%.

The oil/fat material of the oil/fat slurry may comprise 100% of the first oil/fat component without regard to which of the above three types of oil/fat materials is used. It may be advantageous in certain applications for the oil/fat material of the oil/fat slurry to include at least 80% by weight of the first oil/fat component as defined, more preferably at least 95% by weight of the first oil/fat component, and most preferably at least 99% of the first oil/fat component, as defined.

In some instances, it may be desirable to provide the first oil/fat component in the form of a material having low saturated fat content. The material may typically be chosen from the interesterified oil blends and physical oil blends discussed earlier and not the palm oil blends or blends including liquid palm oil.

The oil/fat material may include an effective amount of anti-oxidant when made or when blended into a slurry for inclusion of microwave popcorn packaging. A typical anti-oxidant may be TBHQ (tert-butyl hydroxy quinone) utilized at 200 ppm. TBHQ is available in tenox 20 from Amerol, Farmingdale, N.Y. 11735. Various alternatives are possible, such as mixed tocopherols.

Preferred nutritional compositions may be formulated with respect to selection of an oil/fat component in a microwaveable popcorn composition slurry. Even though the overall microwave popcorn slurry typically contains at least 10% by weight oil/fat material, the total trans fatty acid presence may be no greater than 5% by weight of the oil/fat component. Preferred oil/fat components that meet this definition may be utilized in amounts allowing less than 0.5 grams of trans fatty acids per popcorn serving, even when used in amounts on the order of at least about 32 grams (per package in a microwave popcorn product) and with at least 60 grams of unpopped popcorn kernels in the package.

Certain preferred compositions may provide for low total saturated fat content. A total saturated fat content may be obtained with no greater than 40%, preferably no greater than 35%, based on total oil/fat weight in the popcorn composition when evaluated by GLC analysis, even though the composition includes stearine/fully hydrogenated oil. Some compositions may be achieved with saturated fat content no greater than 14%, and preferably no greater than 12%, based on total food product composition, and a saturated fat content no more than 5 grams per serving, preferably no more than 4 grams per serving. This may be accomplished by selecting the first oil/fat component from either the interesterified blend or the physical oil blends discussed above. When one of the physical oil blends is utilized, it may be preferable to avoid those that may include palm oil above a minimal level.

When selected palm oil blends are used, the saturated fat content may be higher. If palm oil blends are utilized, the methods and principles discussed above may be used to provide a total saturated fat content no greater than 60% and preferably no greater than 55% based on total oil/fat weight in the popcorn composition when evaluated by GLC analysis. Utilizing the palm oil blends, a saturated fat content no more than 19%, preferably no greater than 17%, based on total food product composition and a saturated fat content no greater than 7 grams per serving, typically no greater than 6 grams per serving may be achieved.

Preferred compositions may be formulated to have acceptable and desirable mouth feel characteristics for a typical consumer. Mouthfeel typically relates to such factors as the melting point range and the highest melting or softening point. The first oil/fat component may formulated to possess a Mettler drop point (melting point) within the range of 110° F.-145° F. (43.3°-62.8° C.), typically 115° F.-135° F. (46.1-57.2° C.), while at the same time imparting an acceptably low level of mouthcoat. Mouthfeel refers to the texture of food sensed by the mouth during consumption of a food item. Mouthfeel is an important characteristic in determining consumer acceptance of a food item. Mouthfeel may encompass many characteristics such as crispness, hardness, graininess and mouthcoat. Mouthcoat refers to the food residue left on the surfaces of the mouth, especially the roof of the mouth and the tongue. Certain aspects of mouthcoat include the perceived amount of residue (i.e. a thick or thin layer), the texture of residue (i.e. slippery, waxy, and/or sticky), and the duration of residue (whether it quickly disappears or lingers). Consumption of microwave popcorn may leave a mouthcoat often due in large part to the slurry component of the microwave popcorn. Oil is often a major component in the slurry and may impact the mouthfeel. For example, a pure liquid oil or an oil system containing emulsifiers often leaves a slippery mouthfeel. Oil with a melt point above body temperature often leaves a waxy mouthfeel. A waxy mouthfeel is often considered an undesirable characteristic of microwave popcorn.

An advantage to the principles discussed above is that the slurry in a microwave popcorn bag may be formulated to less likely exhibit undesirable levels of wicking through popcorn packaging at typical handling storage temperatures than liquid oils.

The preferred compositions of microwave popcorn may be used in a variety of popcorn bags found in prior art, such as those constructed using fluorocarbon treated paper. Examples of useable constructions are described in U.S. Pat. Nos. 5,044, 777; 5,081,330; 6,049,072; 5,195,829; and 6,396,036, all incorporated herein by reference. The compositions can also be incorporated into tub products, such as those described in U.S. Pat. Nos. 5,008,024; 5,097,107; and 5,834,046, all incorporated herein by reference.

In addition to the prior art packaging characterized above, compositions may be used in recently developed packaging. Examples include those described in U.S. provisional application 60/544,873, filed Feb. 13, 2004; U.S. Provisional application 60/588,713, filed Jul. 15, 2004; U.S. Provisional application 60/647,637, filed Jan. 26, 2005; PCT US 05/04249, filed Feb. 11, 2005; and U.S. Provisional application 60/574,703, filed May 25, 2004, filed as PCT US 05/08257, filed Mar. 11, 2005, these six references being incorporated herein by reference.

When the first oil/fat component is a physical oil blend as described above, it is typically produced by physically blending fully melted components, such as a liquid oil component, a solid fat component, and, if present, an emulsifier, as previously defined. When the first oil/fat component is a palm oil blend, it is typically prepared by blending the fully melted whole or fractionated palm oils together, without an emulsifier. The term "palm fruit oil" may refer to the whole or non-fractionated oil derived from the palm fruit. Fractionation is a physical process that separates oil based on melting point. The lower melting point fraction is commonly referred to as the olein fraction while the higher melting point fraction is commonly referred to as the stearine fraction. The olein fraction has a lower saturated fat content than the stearine fraction.

Microwave popcorn compositions contained in bags generally involve a collapsed package having a microwave interactive sheet or susceptor with a microwaveable popcorn charge positioned in a covering relation or thermoconductive relation to the microwave interactive construction or susceptor. For many conventional bag arrangements, the package is generally folded into a tri-fold configuration during storage and prior to use. The tri-fold is typically positioned in a moisture barrier overwrap to enhance shelf life.

The microwave popcorn charge may often include at least 50 grams of unpopped popcorn kernels and at least 20 grams of oil/fat, typically having a melting point (Mettler drop point) of at least 100° F. (37.8° C.), usually at least 110° F. (43.3° C.) and typically under 145° F. (62.8° C.), usually under 135° F. (57.2° C.). Often the popcorn charge contains at least 60 grams of unpopped popcorn kernels and at least 25 grams (in non-light oil products) of oil/fat.

Preferably the microwave package includes a susceptor for enhancing the popping of the kernels. Once placed under microwave energy, the packaging containing the susceptor often reaches temperatures in excess of 300° F. In one embodiment, the microwave susceptor is positioned between two plies of the bag on the bag's bottom surface. The susceptor is preferably provided in a location over which the unpopped corn kernels rest when the bag arrangement is unfolded and placed in a microwave oven for cooking. The susceptor may comprise any of a variety of microwave interactive materials including a thin layer of metal, such as vapor deposited metal, metal oxide, carbon and similar materials. The susceptor may be applied directly to the interior of the bag, preferably between the two plies, or may be supported on a sheet of paper or plastic that is subsequently bonded to the packaging. The susceptor preferably comprises a metallized polymeric film, such as Hoechst Celanise polyester film (typically 48-92 gauge) vacuum metallized with aluminum to give a density of 0.2-0.3 as measured by a Tobias densitometer.

The microwave popcorn products of the invention may be quickly and conveniently prepared by the consumer in a single step. The consumer may remove any cellophane overwrap from the microwaveable bag and may place the bag in the microwave oven with the bottom surface of the bag resting on the inner surface of the microwave oven. In the case of a tri-fold bag as described above, initially only the bottom surface of the middle region may rest on the surface of the microwave oven. As the product is exposed to microwave energy, the bag expands, as is well known in the art. Suitable microwaving times for the products of the invention range from about 1.5 minutes to about 4 minutes, and may vary based on a number of variables, including the power of the microwave being used and the presence and size of the susceptor in the microwaveable container.

Additional examples of microwave popcorn formulations may be found in U.S. application Ser. No. 10/475,284, PCT filed on Mar. 29, 2002, and U.S. publication No. 2005/023233, both incorporated herein by reference.

Salt may be added to a bag of microwave popcorn in a slurry comprising oil, fat, salt, flavorings, and/or other ingredients. The microwave bags may have an unsealed open end and are advanced to a first kernel popcorn filling station. The open end of the microwave bag is charged with the desired amount of popcorn kernels. Subsequently, the bags are advanced to a second filling station where the fat/salt slurry is added to the bag. Often, the slurry is added in the form of a vertically dispensed pencil jet for confining the slurry stream, such as in U.S. Pat. No. 4,604,854, issued Aug. 12, 1986, which is incorporated herein by reference. Other single station filling methods are also known in the art for applying the fat/salt slurry as a spray onto the kernel popcorn as the kernel popcorn falls into the bag, such as in U.S. Pat. No. 5,690,979, issued Nov. 25, 1997, which is incorporated herein by reference. The microwave bags including both kernel popcorn and slurry are advanced to a sealing station where the bags are sealed to complete microwave bag closure. The sealed popcorn bags are advanced to later finish packaging operations for folding of the bags, providing the bags with an overwrap, and inserting bags into cartons, bags, etc.

C. Potato Product Embodiments

In another embodiment, a seasoning having a mean particle size less than twenty microns is utilized on potato food products. The potato food products may include french fries, potato chips, and other similar potato derivatives. The potato food products may be baked, fried, or cooked utilizing other methods.

Potato chips or french fries may be prepared utilizing a variety of methods. The initial step is generally prepared by initially slicing or cutting the potato into the desired shape. Shapes may include simple slicing, such as for a potato chip, or batons, as in the case for French fries. After shaping the potato pieces, the potato pieces are generally cooked utilizing various frying or baking methods. Subsequent to cooking, the potato may be seasoned with various seasonings, including sodium chloride having a mean particle size less than 20 microns.

Further explanations describing various methods for making potato chips may be found in U.S. Pat. No. 4,277,510, entitled "Process of Making Potato Chips," U.S. Pat. No. 4,844,930, entitled "Method for Making Potato Chips," and U.S. Pat. No. 4,933,194, entitled "Low Oil Corrugated Potato Chip," all incorporated herein by reference. Relevant discussions of processes for preparing french fries may be found in U.S. Pat. No. 6,969,534, entitled "Process of Preparing Frozen French Fried Potato Product," and United States Patent Publication No. 2005/0266144, entitled "Parfried Frozen French Fry Having High Solids Content," both incorporated herein by reference.

D. Pretzel Embodiments

In another embodiment, a seasoning having a mean particle size less than 20 microns is utilized for seasoning pretzels. A pretzel may be a baked snack formed into a twisted shape, a straight stick, or various other shapes and sizes. The pretzel may be hard or soft. An explanation of a method for making pretzels is U.S. Pat. No. 5,955,118, entitled "Apparatus and Method for Manufacturing Twisted Pretzels," incorporated herein by reference.

E. Formulations

The following list of tables of microwave popcorn formulations utilizing sodium chloride, potassium chloride, and sea salt, all less than 20 microns in size, are intended to be exemplary only and are not necessarily restrictive of the invention as claimed.

The popcorn used in the following examples may be hulled or dehulled, flavored or colored, and/or any size kernel with an internal moisture level of 12-14.5%. The oil used in the following examples may be primarily tri-fatty acid esters of glycerol. Fat is a natural lipid material that is generally solid at room temperature. The oil used is similar to fat but is liquid at room temperature. The term "oil/fat" is meant to refer to oils, natural or modified fats, and/or any semi-solid mixtures at room temperature.

Suitable flavoring agents may include natural, artificial, and synthetic flavors, such as synthetic flavor oils, aromatic flavorings and/or oils, oleoresins and extracts derived from plants, leaves, flowers, fruits, nuts, and so forth. Other examples of suitable flavorings agents may be found in Arctander, S., Perfume and Flavor Chemicals (Aroma Chemicals), Montclair, N.J., 1969, and Allured's Flavor and Fragrance Materials, Carol Stream, Ill., 1993.

Coloring agents may be included in an amount up to 3% by weight, but preferably no more than 1% of the microwave popcorn composition. Suitable coloring agents may further include natural food colors and dyes suitable for food, drug, and cosmetic applications, which are preferably oil dispersible and/or soluble.

The following four tables disclose examples of sodium chloride and potassium chloride utilized in microwave popcorn recipes.

TABLE 5

Orville Redenbacher's ® Smart Pop! Gourmet ®, Butter

| Ingredient | Typical wt. % Low fat or Light fat | Wt. % in preferred composition Low fat or Light fat | Example (grams per bag) Low fat or Light fat |
|---|---|---|---|
| Unpopped popcorn | 75-90 | 80-88 | 67.8 |
| Oil/fat | 7-15 | 9-13 | 10.5 |
| NaCl | 0.5-3 | 1-2.5 | 1.53 |
| KCl | 0-2 | 0.5-1.5 | 0.81 |
| Flavor | .05-3 | 0.05-3 | 0.28 |
| Color | .01-2 | 0.01-2 | 0.04 |

TABLE 6

Orville Redenbacher's ® Light Gourmet ®, Butter

| Ingredient | Typical wt. % Ultra low fat | Wt. % I preferred composition Ultra low fat | Example (grams per bag) Ultra low fat |
|---|---|---|---|
| Unpopped popcorn | 93-97 | 93-95 | 76.3 |
| Oil/fat | 1.5-4 | 1.5-3 | 2.13 |
| NaCl | 0.5-3 | 1-2.5 | 1.39 |
| KCl | 0-2 | 0.5-1.5 | 0.74 |
| Flavor | 0.05-3 | 0.05-1 | 0.37 |
| Color | 0.01-2 | 0.01-1 | 0.02 |

TABLE 7

Orville Redenbacher's ® Gourmet ®, Butter

| Ingredient | Typical Wt. % Typical fat | Wt. % in preferred composition Typical fat | Example (grams per bag) Typical fat |
|---|---|---|---|
| Unpopped popcorn | 60-70 | 64-67 | 61.3 |
| Oil/fat | 25-37 | 28-30 | 28.91 |
| NaCl | 1-4 | 1-2.5 | 1.84 |
| KCl | 0-2 | 0.5-1.5 | 0.78 |
| Flavor | 1-3 | 0.25-1 | 0.43 |
| Color | 0.02-0.1 | 0.04-0.6 | 0.04 |

TABLE 8

Orville Redenbacher's ®, Sweet N' Buttery

| Ingredient | Typical Wt. % High fat | Wt. % in preferred composition High fat | Example (grams per bag) High fat |
|---|---|---|---|
| Unpopped popcorn | 52-67 | 57-65 | 54.7 |
| Oil/fat | 28-45 | 34-40 | 31.48 |
| NaCl | 1-4 | 1-2 | 1.21 |
| KCl | 0-2 | 0.5-1.5 | 0.13 |
| Flavor | 0.1-4 | 0.3-1 | 0.47 |
| Color | 0.02-1.5 | 0.03-1 | 0.06 |

The following four tables disclose examples of sodium chloride and sea salt utilized in microwave popcorn recipes.

TABLE 9

Orville Redenbacher's ® Smart Pop! Gourmet ®, Butter

| Ingredient | Typical Wt. % Low fat or light fat | Wt. % in preferred composition Low fat or light fat | Example (grams per bag) Low fat or light fat |
|---|---|---|---|
| Unpopped Popcorn | 75-90 | 80-88 | 67.8 |
| Oil/Fat | 7-15 | 9-13 | 10.5 |
| Sea Salt | 1-6 | 1-2 | 1.5 |
| Salt | 0-3 | 0.25-1.5 | 0.75 |
| Flavor | 0.05-0.3 | 0.05-3 | 0.28 |
| Color | 0.01-2 | 0.01-2 | 0.04 |

TABLE 10

Orville Redenbacher's ® Light Gourmet ®, Butter

| Ingredient | Typical Wt. %<br>Ultra low fat | Wt. % in preferred<br>composition<br>Ultra low fat | Example (grams<br>per bag)<br>Ultra low fat |
|---|---|---|---|
| Unpopped Popcorn | 93-97 | 93-95 | 76.3 |
| Oil/Fat | 1.5-4 | 1.5-3 | 2.13 |
| Sea Salt | 1-6 | 1-2.5 | 1.66 |
| Salt | 0-3 | 0.5-1.25 | 0.83 |
| Flavor | 0.05-3 | 0.05-1 | 0.37 |
| Color | 0.01-2 | 0.01-1 | 0.02 |

TABLE 11

Orville Redenbacher's ® Gourmet ®, Butter

| Ingredient | Typical Wt. %<br>Typical fat | Wt. % in preferred<br>composition<br>Typical fat | Example (grams<br>per bag)<br>Typical fat |
|---|---|---|---|
| Unpopped Popcorn | 60-70 | 64-67 | 61.3 |
| Oil/Fat | 25-37 | 28-30 | 28.91 |
| Sea Salt | 1-6 | 1-4.5 | 1.95 |
| Salt | 0-3 | 0.5-2 | 1 |
| Flavor | 1-3 | 0.25-1 | 0.43 |
| Color | 0.02-0.1 | 0.04-0.6 | 0.04 |

TABLE 12

Orville Redenbacher's ®, Sweet N' Buttery

| Ingredient | Typical Wt. %<br>High fat | Wt. % in preferred<br>composition<br>High fat | Example (grams<br>per bag)<br>High fat |
|---|---|---|---|
| Unpopped Popcorn | 52-67 | 57-65 | 54.7 |
| Oil/Fat | 28-45 | 34-40 | 31.48 |
| Sea Salt | 1-6 | 1-2 | 1.31 |
| Salt | 0-3 | 0.25-1 | 0.66 |
| Flavor | 0.1-4 | 0.3-1 | 0.47 |
| Color | 0.02-1.5 | 0.03-1 | 0.06 |

F. Examples

The following list of examples is exemplary and explanatory only and is not necessarily restrictive of the invention as claimed.

Example 1

This example presents an application of microfine salt as a component of breadings or toppings for frozen or refrigerated foods. Further in the following example, after removing the desired amount of sodium, the remaining salt may be replaced with microfine salt to achieve a saltier flavor than using the industry-standard salt. The microfine salt can be applied in a non-aqueous suspension utilizing adhesion or added directly into the breading or topping. The food products may include poultry, red meat, fish, baked goods, vegetables, or other appetizers including potatoes, onions, or cheeses, and may contain seasoning, flour, wheat, cornmeal, nuts (tree or legumes), and/or soybeans. Processes may include frying, baking, roasting, partial or fully cooking, or extrusion. Specific examples may include breaded zucchini, mozzarella, mushrooms, or chicken, flavored or unflavored onion rings, potato products (i.e., french fries), pastry pie crumb topping, or breaded pasta (i.e., toasted ravioli).

Example 2

This example presents an application of microfine salt as a component for dry mix breadings for the covering of food products. Further in the following example, after removing the desired amount of sodium, the remaining salt may be replaced with microfine salt to achieve a saltier flavor than using the industry-standard salt. The microfine salt can be applied directly as a part of the breading. The food products may include poultry, red meat, fish, baked goods, vegetables, or other appetizers including potatoes, onions, or cheeses, and may contain seasoning, flour, wheat, cornmeal, nuts (tree or legumes), or soybeans. Processes may include frying, baking, roasting, partial or fully cooking, or extrusion. A specific example includes SHAKE 'N BAKE®, manufactured by Kraft Foods, Inc.

Example 3

This example presents an application of microfine salt as a component in a seasoning blend for a topical application. Further in the following example, after removing the desired amount of sodium, the remaining salt may be replaced with microfine salt to achieve a saltier flavor than using the industry-standard salt. The seasoning can be added to the food as part of a non-aqueous suspension using adhesion principles. The food products may include poultry, red meat, fish, baked goods, vegetables, or other appetizers including potatoes, onions, or cheeses (topical or non-aqueous). The topical application may include seasonings or bulking agents. A specific example may include seasoning salt.

Example 4

This example presents an application of microfine salt as a component in cured and non-cured dried meats as a topical additive. Further in the following example, after removing the desired amount of sodium, the remaining salt may be replaced with microfine salt to achieve a saltier flavor than using the industry-standard salt. The seasoning can be added to the food as part of a non-aqueous suspension using adhesion principles. The meats may include beef, bacon, or bacon-flavored mimics. The dried meats may be dried, freeze-dried, extruded or baked. A specific example includes bacon bits.

Example 5

This example presents an application of microfine salt as a component in non-snack, cereal-based food compliments. Further in the following example, after removing the desired amount of sodium, the remaining salt may be replaced with microfine salt to achieve a saltier flavor than using the industry-standard salt. The microfine salt can be added as part of a non-aqueous suspension or directly to the cereal-based food. The cereal-based food compliments may include bread, wheat, corn, oats, millet, rye, soybeans, cornmeal, seasoning, nuts (tree or legumes), or rice, and may be processed by baking, frying, extruding, puffing, drying, or may be left unprocessed. Specific examples may include croutons or bread crumbs.

Example 6

This example presents an application of microfine salt as a direct addition to natural and artificial spreads. Further in the following example, after removing the desired amount of sodium, the remaining salt may be replaced with microfine salt to achieve a saltier flavor than using the industry-standard salt. The natural or artificial spreads may contain nuts (tree or legumes), nut ingredients, soybeans, or seeds. Specific examples may include hazelnut spread, soy butter, or peanut butter.

Example 7

This example presents an application of microfine salt for use as a direct addition or part of articles in non-aqueous batters. Further in the following example, after removing the desired amount of sodium, the remaining salt may be replaced with microfine salt to achieve a saltier flavor than using the industry-standard salt. The microfine salt may be encapsulated if the batter is aqueous. The batters may include edible fats and oils, flour, salt, seasoning, wheat, corn, cornmeal, nuts (tree or legume), or soybeans. Specific examples include potato wedges, onion rings, fish, and cheese sticks.

Example 8

This example presents an application of microfine salt for use as a direct addition to prepared pie crusts. Further in the following example, after removing the desired amount of sodium, the remaining salt may be replaced with microfine salt to achieve a saltier flavor than using the industry-standard salt. The microfine salt may be added directly to the pie crust mix as part of a non-aqueous suspension. The pie crusts may contain seasoning, flour, wheat, corn, cornmeal, nuts (trees or Legumes), or soybeans. A specific example is a graham cracker pie crust.

Example 9

This example presents an application of microfine salt added to a dried, grated, or shredded cheese for topical use. Further in the following example, after removing the desired amount of sodium, the remaining salt may be replaced with microfine salt to achieve a saltier flavor than using the industry-standard salt. The microfine salt may be directly added to the cheese or as a part of a non-aqueous suspension. The cheese may be dried or dehydrated. Specific examples include parmesan, romano, asiago, or other dried, grated, or shredded cheeses with salt and other ingredients.

Example 10

This example presents an application for the direct addition of microfine salt into oil or fat-based products. Further in the following example, after removing the desired amount of sodium, the remaining salt may be replaced with microfine salt to achieve a saltier flavor than using the industry-standard salt. The microfine salt may be added as a component in a non-aqueous suspension. The oil or fat based products may be natural, conditioned, de-gummed, stabilized, deodorized, homogenized, bleached, or winterized. The oil or fat products may contain partially or fully hydrogenated oil and fat based products. Uses may include confectionary non-aqueous fillings, sprays, liquid or solid flavored edible cooking oils or fats. Specific examples may include Oreo filling, manufactured by Nabisco, PAM spray, manufactured by ConAgra, or butter flavored vegetable shortening. An oil based slurry, such as PAM with microfine salt, may be topically applied to French fries, potato chips, or the like.

Example 11

This example presents an application of microfine salt as an application for cereals and cereal bars. Further in the following example, after removing the desired amount of sodium, the remaining salt may be replaced with microfine salt to achieve a saltier flavor than using the industry-standard salt. The microfine salt may be added directly to the cereal or cereal bars or as a part of a non-aqueous suspension. The cereal or cereal bars may include bread, wheat, corn, oat, millet, rye, soybeans, cornmeal, seasoning, nuts (tree or legumes), rice, or granola processed by baking, extruding, roasting, toasting, frying, drying, or puffing. Specific examples may include any type of breakfast cereal, or any type of granola bar that is non-aqueous, pressed, and formed.

Example 12

This example presents a topical application of microfine salt for vegetables and fruits. Further in the following example, after removing the desired amount of sodium, the remaining salt may be replaced with microfine salt to achieve a saltier flavor than using the industry-standard salt. The microfine salt is added directly to the vegetables and fruits. The vegetables and fruits may be freeze-dried or processed other ways. A specific example is Gerber freeze-dried sweet corn for babies, manufactured by the Gerber Products Company.

Example 13

This example presents a topical application of microfine salt for snack foods. Further in the following example, after removing the desired amount of sodium, the remaining salt may be replaced with microfine salt to achieve a saltier flavor than using the industry-standard salt. The microfine salt may be added directly to the snack food or as a part of a non-aqueous suspension. The snack foods can contain rice, oats, corn, soybeans, wheat, cornmeal, flour, seasoning, potato, rye, millet, or nuts (tree and legumes). The snack foods can be flavored and unflavored snack crackers, crisps, cakes, mixes, chips, shells, cookies, crackers, pork rinds, and can be toasted, roasted, baked, fried, extruded, puffed, and the like. Specific examples include potato chips (i.e. Pringles, manufactured by Procter & Gamble), Chex mix, manufactured by General Mills, Inc., pork rinds, corn chips, popcorn, soy or rice cakes, popcorn that is microwavable or ready-to-eat, saltines, Chips Ahoy cookies, manufactured by Nabisco, bagel chips, pita chips, Planters peanuts, manufactured by Kraft Foods Global, Inc., and other similar examples.

IV. Taste Mechanism

Employing a mean particle size of less than 20 microns, such as a mean particle size of 10 microns, is essential to maximizing the taste impact of the seasoning. While many theories about the mechanism by which chemicals elicit a specific taste sensation exist, most of these theories agree that tastants must be water soluble to be tasted. Taste cell receptors exist within taste buds grouped together on the human tongue. These receptors allow humans to detect differences in varying concentrations of materials. For example, taste cell receptors enable an individual to differentiate between a highly concentrated or saturated solution of sodium chloride dissolved in water and a significantly lesser amount of sodium chloride fully dissolved in water. A weight of sodium chloride comprising a small mean particle size provides more surface area than the same weight of sodium chloride comprising a larger mean particle size and the same crystal structure.

The rate at which a substance is dissolved into solution is dependent on multiple factors. One such factor is the surface area of the substance. When a substance is exposed to a solvent, the surface area in contact with the solvent may be termed the solvent exposed area. In general, the greater the solvent exposed area, the faster the dissolution of the substance. The present invention utilizes this particular dissolution property combined with the function of taste receptors to maximize taste impact of seasoning, and particularly sodium chloride introduced with a second seasoning component.

The present invention utilizes small mean particle sizes to increase the solvent exposed area of the seasoning components. For example, a particular weight of sodium chloride having a mean particle size of 10 microns will dissolve into a given volume of saliva more rapidly than an identical weight of sodium chloride having a mean particle size of 250 microns, comprising the same crystal structure, and in an identical volume of saliva. After a short period of time, the 10 micron solution will have a higher concentration of dissolved sodium chloride than the 250 micron solution. Tasting response to sensory stimuli is rapid, usually occurring within 50 milliseconds. Thus, only a short amount of time is allotted before a tastant elicits a response on the taste receptors. Therefore, by using a smaller mean particle size, the seasoning dissolves into solution more rapidly and elicits a larger taste impact than seasoning comprising a larger mean particle size.

It will be appreciated by those in the art, that scientists do not know entirely how humans detect salty taste. However, many agree sodium is the chemical responsible for the characteristic salty taste. Many experts believe a sodium receptor is responsible but such a receptor has not been identified. Other experts agree the yet unidentified receptor structures are taste receptor cells within taste buds; however, it is unknown how such receptor cells convert chemical information from sodium into the electrical language of nerves. Sweet and bitter taste molecules interact with protein receptors similar to a lock & key. Conversely, salty taste appears to be mediated by ion channels, or pores, that span the taste cell's membrane. Most researchers agree that tastants (flavor molecules) must be water soluble to be sensed (tasted).

The present invention utilizes a smaller mean particle size to elicit a larger taste impact of seasoning. Relative taste impact primarily is a function of tastant dissolution rate. As such, the amount of tastant required for a desired taste becomes less critical for producing the desired taste. For example, while a large amount of coarse salt may produce a highly concentrated solution, it may take a significant portion of time, relative to the short time required for tasting, to achieve this high concentration. On the other hand, while a smaller amount of fine salt may not produce as concentrated a solution after the significant portion of time, it may achieve a higher concentration after a short period of time, due to the enhanced solubility. Less fine salt is required to produce a desired taste impact. Therefore, utilizing smaller mean particle size sodium chloride enhances and potentiates the food flavor and results in the same taste impact while requiring less dietary sodium.

If in fact salty taste is detected by the way in which it goes into solution at specific receptors, and changes in solution concentration are part of the tasting mechanism, then particle dissolution rate is a key to salt taste perception and food flavor potentiation. One way to affect this rate is to control salt mean particle size and the resultant solvent exposed area. Additionally, decreasing the mean particle size of salt increases the number of salt particles per unit weight increasing the distribution of the seasoning on the food product and improves distribution over salt sensing areas (i.e. taste bud receptors).

Salt taste perception is dependent upon the sodium ion concentration at the proper location on the tongue. Smaller particle salt compared to larger particle salt, at the same unit weight has a greater surface area, and thus will go into solution more quickly. Table 13 below was used to construct FIG. 8.

TABLE 13

Mean particle size surface area calculations

| MPS | SA/particle | Particle volume | # of particles per unit weight | SA per unit weight |
|---|---|---|---|---|
| 5 | 150 | 125 | 512 | 76800 |
| 10 | 600 | 1000 | 64 | 38400 |
| 20 | 2400 | 8000 | 8 | 19200 |
| 40 | 9600 | 64000 | 1 | 9600 |

*MPS = mean particle size (units)
*SA = Surface area (units)

These calculations were based on a cubic-shaped salt crystal. The first column displays the salt mean particle size as calculated by Malvern Laser Diffraction techniques, column 2 displays the surface area per particle, column 3 displays the volume per particle, column 4 displays the relationship between number of particles for a given weight for salt for different sizes, and column 5 displays the relationship between the surface area for a given weight for salt at different sizes. This shows that when the mean particle size is cut in half, the surface area per unit weight doubles.

The dissolution rate is thought to play a role in the perception of salty taste. Dissolution rate is affected by surface area. A greater concentration of sodium ions will be present at the taste receptor site when using smaller particle salt. This will deliver a larger, initial salt perception compared to that of larger particle salt because the dissolution rate may be affected by surface area of the solute. In other words, the smaller the particle, the greater the surface area per unit weight. For example, 10 grams of 10 micron salt will have a larger surface area than 10 grams of 20 micron salt. The greater the surface area of the salt, the quicker it dissolves. The quicker the salt dissolves at the desired site, the quicker salt is perceived by taste receptors. It may be advantageous to use lower salt amounts for achieving similar salt perception, or the same amount of salt and increase salt perception.

Results indicated that as mean particle size decreases, salt perception increases, especially at earlier times during the eating process. A salt size of 10 microns was optimal.

Additionally, decreasing the mean particle size of salt increases the number of salt particles per unit weight, thereby increasing the distribution of the seasoning on the food product. For example, Table 13 demonstrates that decreasing the mean particle size by half results in 8 times the number of particles when the weight is kept constant. The information in Table 13, along with the images shown in FIGS. 3-6, demonstrates that salt coverage on the food product can be enhanced by decreasing mean particle size. This allows more particles to be presented to taste bud receptors. For example, a food that contains salt with a mean particle size of 10 microns will deliver more salt particles to a given number of taste receptors than when using 20 micron salt.

Relevant discussions of how taste is perceived is explained in T. A. Gilbertson et al., *Taste transduction: appetizing times in gustation*, Neuroreport, 14:905-911 (2003), and in E. Neyraud et al., *NaCl and sugar release, salivation and taste*

*during mastication of salted chewing gum*, Physiology & Behavior, 79 (2003) 731-737, both incorporated herein by reference. Other relevant discussions regarding mammalian salt taste receptors and salt taste channels are explained in Vijay Lyall et al., *The mammalian amiloride-insensitive non-specific salt taste receptor is a vanilloid receptor-1 variant*, J Physiol 558.1 (2004) pp. 147-159, and United States Patent Application Publication 2005/0031717, both incorporated herein by reference.

Although, taste qualities are found in all areas of the tongue, salt taste perception depends on sodium ion concentration at the proper location on the tongue (within operable range of a suitable taste bud receptor cell). Smaller particle salt compared to larger particle salt, at the same unit weight, has a greater surface area, and thus will go into solution more quickly. To efficiently produce the desired salt taste impact it is necessary to rapidly increase sodium ion concentration near as great a number of receptor cells as possible. A greater concentration of sodium ions is present at sites of recently dissolved particles, when using smaller particle salt. This delivers a larger initial salt perception compared to that of larger particle salt (where comparable dose weights are employed). Likewise, a higher available ion concentration near receptor cells act to increase receptor sensitivity and act as solvents to free more food and other none salt based flavors.

Five micron salt may be less effective because these particles may have a greater chance of fitting between areas in which do not contain taste receptors and dissolve in an undesirable area. Additionally, if salt were to dissolve too quickly, the initial salty impact would be less significant given that the amounts of sodium in solution become more similar over time, regardless of particle size.

It will be apparent to those of skill in the art, that two like sized solutions of brine, a first solution containing 1.0 l of $H_2O$ and 1.0 g of NaCl of 10 μm mean particle size, and a second solution containing 1.0 l of $H_2O$ and 1.0 g of NaCl of 25 μm mean particle size, will taste equivalently or equally salty. Further, that in comparing a third and fourth solution, wherein the third solution contains 1.0 l of $H_2O$ and 0.5 g of NaCl of 10 μm mean particle size, and a fourth solution containing 1.0 l of $H_2O$ and 1.0 g of NaCl of 25 μm mean particle size, will not taste equivalently or equally salty. However, as will be recognized by those of equal skill, a starch snack (for example), having a surface area of 32.0 cm² (such as a potato chip), which is seasoned with 10 mg of NaCl having a mean particle size of 10 μm (reasonably distributed) will taste saltier than an equally sized chip (32.0 cm²) seasoned with 10 mg of NaCl having a mean particle size of 25 μm (reasonably distributed). It is currently believed, but not theoretically relied upon, that by increasing the number of salt particles per unit weight, acts to increase the density (particles per unit volume) of distributed particles on a seasoned food product, so as to increase the number of receptors receiving a salt particle at least one of before, during, and after mastication. This provides an initial desirable high salty taste impact with a reduced amount of salt. As has been disclosed herein, as particle size decreases and approaches approximately 5.0 μm, this effect diminishes. Therefore, a preferred embodiment of the present invention utilizes a seasoning having a mean particle size of between 5 and 20 μm (with 10 μm most currently preferred).

This result of reduced dietary sodium intake while retaining the desired impact may be supported by multiple views of the mechanism by which tastants elicit taste. For instance, this result may be supported by the lock and key view or the shallow contour view, which are similar to an enzyme/substrate relationship. Under these models, the relationship between the amount of seasoning consumed and the taste impact may be approximated by a simplified dose-response curve, as depicted in FIG. 1. According to these models, a normalized response may be of the form $$\text{response} \propto \frac{1}{1+e^{-A}}$$

where A is the concentration of a tastant. Thus, a given response, such as taste impact on a taste receptor, is dependent upon the concentration of a tastant. A small particle size tastant, such as sodium chloride, will dissolve into saliva quickly, resulting in a more concentrated solution after a short period of time. A larger particle size of sodium chloride will dissolve into saliva more slowly and may result in a lower concentration solution in the same period of time. According to the simplified dose-response curve, the response will be higher for the smatter particle size solution after this short period of time. Response increases for increasing concentration on the simplified dose-response curve. Thus, taste impact increases for increasing concentration of tastant, according to these models.

Figure 2:
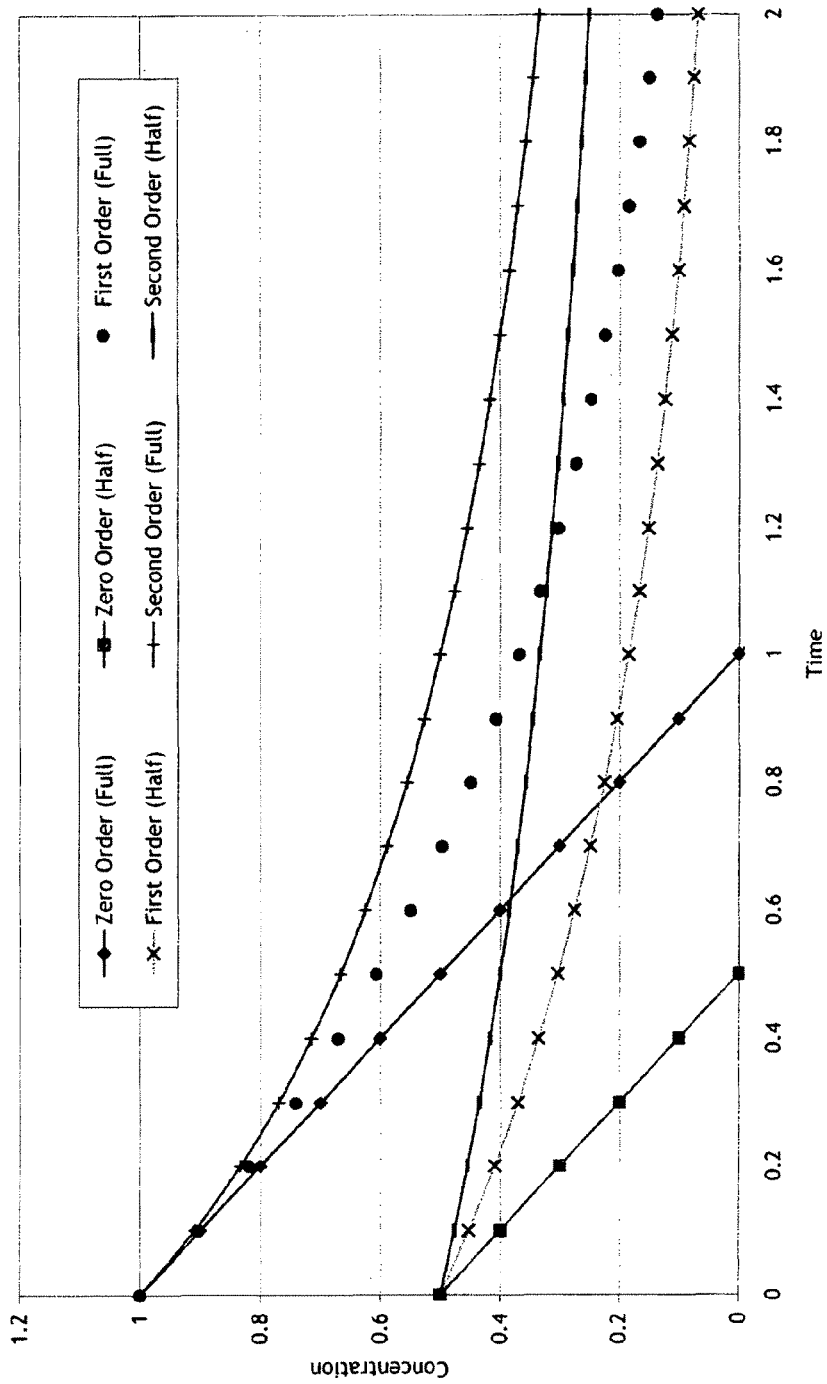
FIG. 2 is a model concentration versus time graph for a zero order reaction, a first order reaction, and a second order reaction for two initial concentrations of a given solute.
Figure 3:
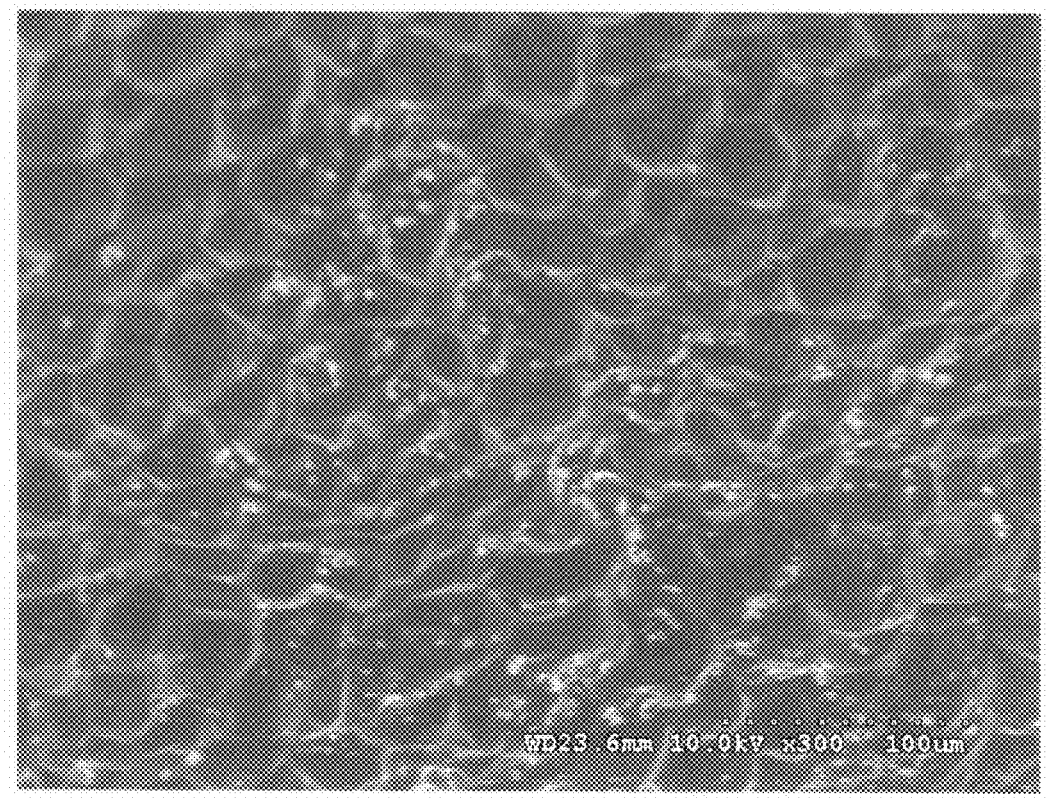
FIG. 3 is a scanning electron microscope image magnified 300 times, illustrating five micrometer sodium chloride distributed on the surface of a popped kernel of popcorn.
Figure 4:
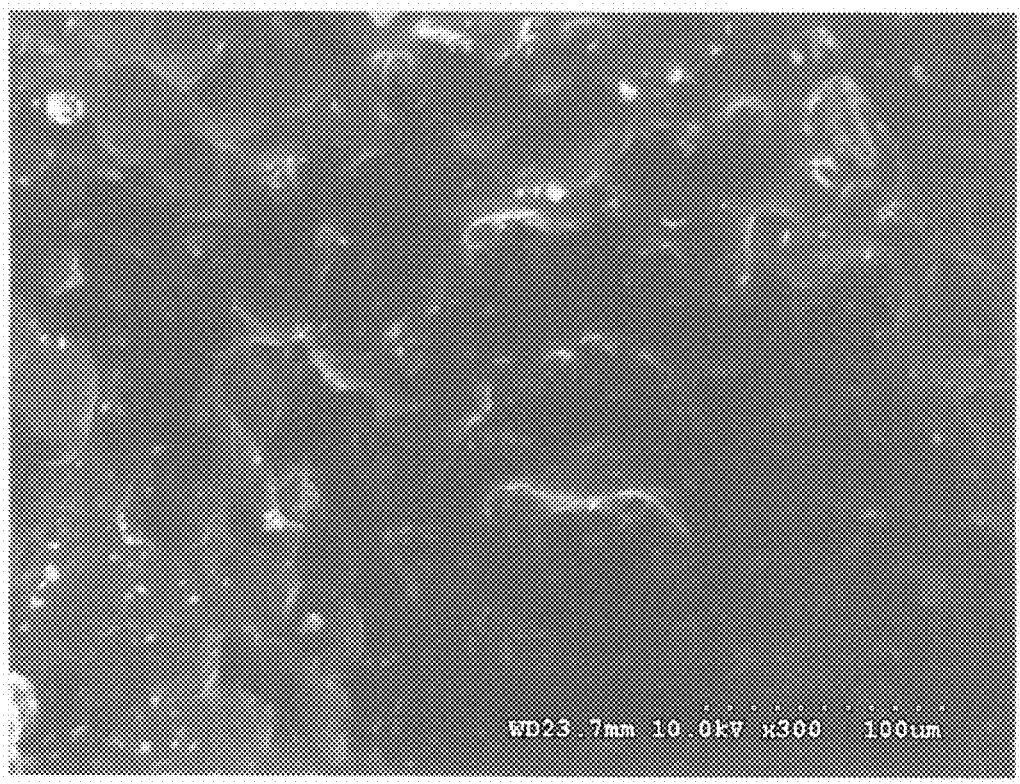
FIG. 4 is a scanning electron microscope image magnified 300 times, illustrating ten micrometer sodium chloride distributed on the surface of a popped kernel of popcorn.
Figure 5:
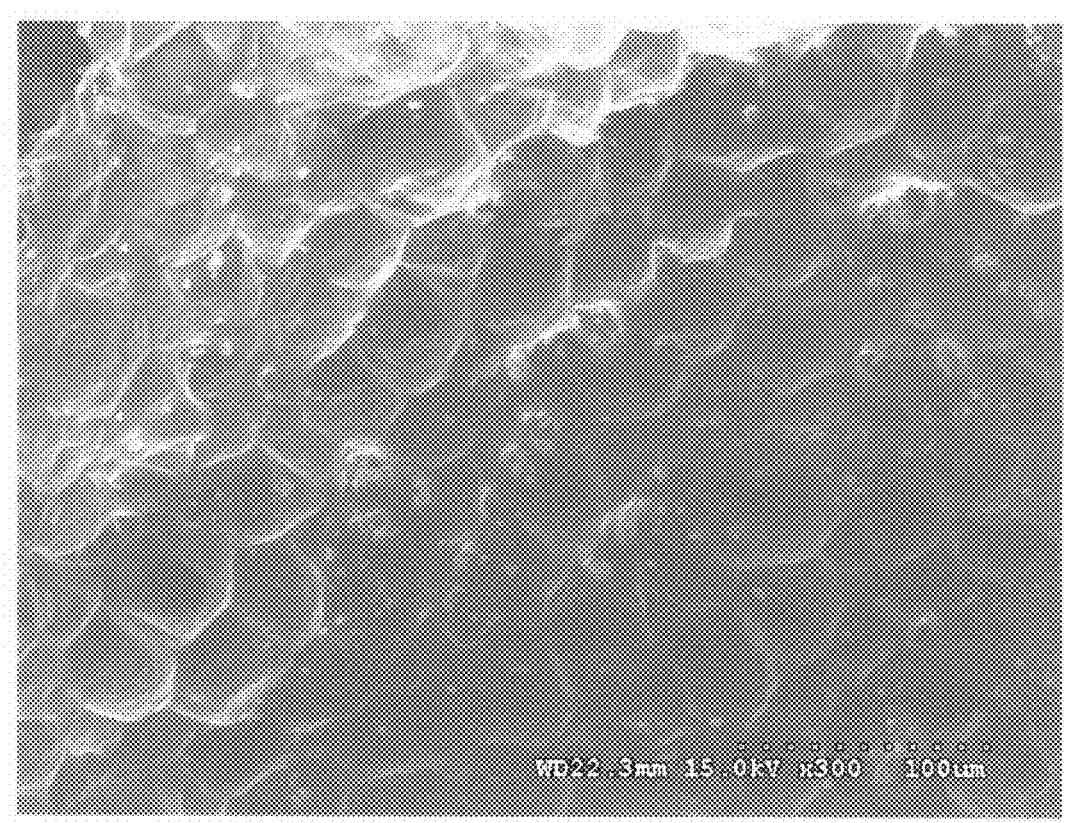
FIG. 5 is a scanning electron microscope image magnified 300 times, illustrating fifteen micrometer sodium chloride distributed on the surface of a popped kernel of popcorn.
Figure 6:
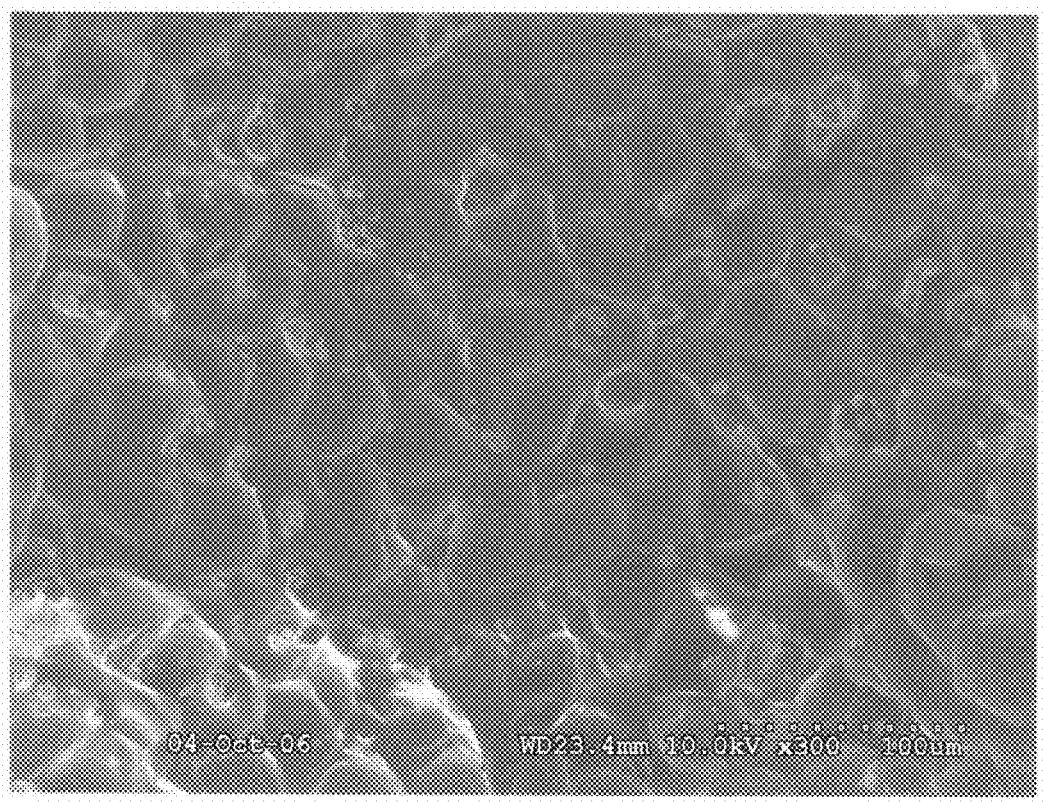
FIG. 6 is a scanning electron microscope image magnified 300 times, illustrating twenty micrometer sodium chloride distributed on the surface of a popped kernel of popcorn.

Retaining a desired impact may also be approximated by the chemical tastant-receptor interaction model. As explained above, tastes are differentiated by the symmetrical nature of the interactions, in which no chemical products are formed. Thus, the interactions of this model may be approximated by chemical reaction equations solely dependent upon the concentration of the tastant. As shown in FIG. 2, approximate concentration versus time curves for three reaction orders and two initial concentrations are depicted. FIG. 2 is a theoretical graph, where the units for concentration and time are dependent on a theoretical rate constant k, which differs for each reaction order. While no products are formed, the interaction between the chemical tastant and the receptor can be approximated as a product for the purposes of modeling. Also, since the taste receptor cells remain fixed and essentially unchanged by the interaction, the concentration of the tastant is the limiting factor of the reaction rate. So according to this model, the initial concentration of tastant is the driving force for the subsequent "reactions." Since the chemical tastant-receptor interaction model is theoretical, the reaction rate for the tasting "reaction" must also be approximated. FIG. 2 displays three possible reaction rates: zero order (rate is constant), first order (rate∝[A]), and second order (rate∝[A]²), where [A] is the concentration of a chemical tastant, such as sodium chloride. These reaction curves are approximate and account for initial doses of tastant, rather than a slow dissolving process. Therefore, this approximation may be viewed in two ways. First, the tastants are given a short time to dissolve before interacting with taste receptors, where no additional tastants are allowed to dissolve. In this instance, smaller particle size seasoning, such as sodium chloride, will dissolve rapidly, resulting in a larger initial concentration when compared to larger mean particle solutions. When comparing like ordered reactions, the higher initial concentration remains at a higher level throughout the "reaction." Taste cell receptors can distinguish between varying concentrated solutions and may recognize this difference as a difference in taste impact. Second, the tastants are allowed to fully dissolve before interacting with the taste receptors. In this instance, where two different particle sizes are used, the initial concentration would remain the same if the same mass of tastants is used. There would be no difference in the concentrations of the two solutions over time. However, suppose less mass was used for the smaller particle size solution. In this case, the initial concentration would be less. For reaction orders greater than zero, the difference in concentrations between the smaller mean particle solution and the larger mean particle solution becomes smaller as time progresses. Therefore, the taste impact difference becomes less apparent to an individual with time. These two alternative ways to view this model support using less seasoning with smaller particle size. The smaller particle size will allow a higher concentration solution after a short period of time, and, with regard to total concentration, the difference between a higher concentration and a lower concentration becomes less evident over time (for reaction orders greater than zero). Therefore, less sodium chloride of a smaller mean particle size (e.g. 10 microns) may be used as a seasoning component, while maintaining the desired taste impact.

The present invention allows 25 to 75% sodium reduction without reducing salt flavor or taste impact when utilized in salting desirable consumer snacks. A thirty percent reduction in salt use by the assignee of this invention would remove approximately 4 million pounds of sodium from its annual output of microwave popcorn packages.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A flowable solid seasoning composition for reducing dietary sodium intake, comprising:
   a salt component comprising an amount of small particle sodium chloride having a mean distribution curve particle size less than or equal to 20 microns for reducing sodium content of the flowable solid seasoning composition,
   wherein the flowable solid seasoning composition exhibits a salt intensity on a weight per weight basis that is about the same as or greater than the salt intensity of a second flowable solid seasoning composition, the second flowable solid seasoning differing from the flowable solid seasoning composition in that the second flowable solid seasoning composition comprises a greater percent by weight of sodium chloride.

2. A seasoned food product for reducing dietary sodium intake, comprising:
   a food product, and
   a portion of the flowable solid seasoning composition of claim 1 for flavoring said food product,
   wherein the seasoned food product exhibits a flavor intensity that is about the same as the flavor intensity of the same food product seasoned with an equivalent portion of a second flowable solid seasoning composition, the second flowable solid seasoning composition differing from the flowable solid seasoning composition of claim 1 in that the second flowable solid seasoning composition comprises a greater percent by weight of sodium chloride.

3. The seasoned food product of claim 2, the flowable solid seasoning composition comprising sodium chloride, potassium chloride, magnesium chloride, a bulking agent, a flavoring, or a bitterness masking agent that complements an organoleptic property of the flowable solid seasoning composition or reduces the amount of the portion of the flowable solid seasoning composition required for flavoring the food product.

4. The seasoned food product of claim 3, wherein the bulking agent comprises starch or a starch derivative.

5. The seasoned food product of claim 2, wherein the portion of the flowable solid seasoning composition is deposited on the food product via a sprayed oil and seasoning dispersion.

6. The seasoned food product of claim 2, wherein the portion of the flowable solid seasoning composition includes at least one of a natural sea salt, a manufactured sea salt, or a flavored salt.

7. The seasoned food product of claim 2, further comprising a cookware release composition, wherein the cookware release composition functions as a carrier for the portion of flowable solid seasoning composition.

8. The seasoned food product of claim 2, wherein the food product is at least 50% fat free.

9. The seasoned food product of claim 2, wherein the seasoned food product comprises a seasoned microwave popcorn product comprising a charge of popcorn kernels.

10. The seasoned food product of claim 2, wherein the seasoned food product comprises a seasoned ready to eat popcorn product comprising a charge of popped popcorn kernels.

11. The flowable solid seasoning composition of claim 1, further comprising potassium chloride, a bulking agent, or a bitterness masking agent for complementing an organoleptic property of the flowable solid seasoning composition or reducing the amount of sodium chloride in the flowable solid seasoning composition.

12. The flowable solid seasoning composition of claim 11, wherein the bulking agent comprises starch or a starch derivative.

13. The flowable solid seasoning composition of claim 11, wherein the organoleptic property of the seasoning is salt intensity or butter flavor intensity.

14. The flowable solid seasoning composition of claim 1, wherein the salt component includes at least one of a natural sea salt, a manufactured sea salt, or a flavored salt.

15. The flowable solid seasoning composition of claim 14, wherein the sea salt comprises, a mean distribution curve particle size greater than or equal to five microns and less than or equal to twenty microns.

16. The flowable solid seasoning composition of claim 15, wherein the sea salt has a mean particle size of 10 microns.

17. The flowable solid seasoning composition of claim 1, further comprising a cookware release composition, wherein the cookware release composition functions as a carrier for the salt component.

18. A method for seasoning a food product for reducing dietary sodium intake, comprising:
   selecting a food product,
   and
   applying the flowable solid seasoning composition of claim 1 to the food product.

19. The method of claim 18, wherein the flowable solid seasoning composition comprises potassium chloride, a bulking agent, or a bitterness masking agent for complementing an organoleptic property of the flowable solid seasoning composition or reducing the amount of sodium chloride in the flowable solid seasoning composition.

20. The method of claim 19, wherein the bulking agent comprises starch or a starch derivative.

21. The method of claim 18, wherein the flowable solid seasoning composition is applied to the food product using a non-aqueous vacuum brine system.

22. The method of claim 18, wherein the flowable solid seasoning composition comprises a cookware release composition, wherein the cookware release composition functions as a carrier for the salt component.

23. The method of claim 18, wherein the food product is at least 50% fat free.

24. The flowable solid seasoning composition of claim 1, wherein the small particle sodium chloride comprises a mean particle size greater than or equal to five microns and less than or equal to twenty microns.

25. The flowable solid seasoning composition of claim 24, wherein the small particle sodium chloride has a mean particle size of ten microns.

26. The seasoning of claim 1, wherein the small particle sodium chloride includes at least one of dendritic sodium chloride, sodium chloride derived from the Alberger process, or sodium chloride pressed into flakes.

27. The flowable solid seasoning composition of claim 1, wherein the sodium chloride comprises a d90-value of less than 20 microns.

28. The flowable solid seasoning composition of claim 1, wherein the salt component comprises 50% to 70% by weight sodium chloride.

29. The flowable solid seasoning composition of claim 1, wherein the salt component further comprises potassium chloride.

30. The flowable solid seasoning composition of claim 29, wherein the salt component comprises at least 5% potassium chloride by weight.

31. The flowable solid seasoning composition of claim 30, wherein the salt component comprises about 30% potassium chloride by weight.

32. The flowable solid seasoning composition of claim 29, wherein the potassium chloride comprises a d90-value of less than 200 microns.

33. The flowable solid seasoning composition of claim 29, wherein the potassium chloride comprises a mean distribution curve salt particle size of 5 microns to 20 microns.

34. The flowable solid seasoning composition of claim 29, wherein the potassium chloride comprises a d90-value of less than 25 microns.

35. The flowable solid seasoning composition of claim 1, wherein the salt component comprises a mean distribution curve particle size greater than or equal to five microns and less than or equal to twenty microns.

36. A seasoned microwave popcorn product for reducing dietary sodium intake, comprising:
a charge of popcorn kernels having a first perceived taste impact, and
a first charge of seasoning for flavoring the charge of popcorn kernels having a mean distribution curve particle size less than and equal to 20 microns,
wherein the charge of seasoning provides a second perceived taste impact greater than a third perceived taste impact, which would be provided by a charge of the seasoning having a mean distribution curve particle size greater than 20 microns.

37. The seasoned microwave popcorn product in claim 36, further comprising a bag for containing the charge of popcorn kernels and the charge of seasoning.

38. The seasoned microwave popcorn product in claim 36, wherein the charge of seasoning includes at least one of sodium chloride and potassium chloride.

39. The seasoned microwave popcorn product in claim 36, further comprising a second charge of seasoning selected for at least one of complementing the first charge of seasoning and reducing the amount of the first charge of seasoning required for flavoring the food product.

40. The seasoned microwave popcorn product in claim 39, wherein the first charge of seasoning is deposited at least partially around the second charge of seasoning.

41. The seasoned microwave popcorn product in claim 40, wherein the first charge of seasoning includes salt and the second charge of seasoning includes at least one of starch and a starch derivative.

42. The seasoned microwave popcorn product in claim 39, wherein the second charge of seasoning includes at least one of sodium chloride, potassium chloride, a bulking agent, and a bitterness masking agent.

43. The seasoned microwave popcorn product in claim 42, wherein the bulking agent comprises at least one of starch and a starch derivative.

44. The seasoned microwave popcorn product in claim 36, wherein at least a portion of the charge of seasoning is deposited on the charge of popcorn kernels.

45. The seasoned food product in claim 36, further comprising a cookware release composition, wherein the cookware release composition functions as a carrier for the first charge of seasoning.

46. The seasoned food product in claim 36, wherein the food product is at least 50% fat free.

47. A seasoned ready to eat popcorn product for reducing dietary sodium intake, comprising:
a charge of popped popcorn kernels having a first perceived taste impact, and
a charge of seasoning for flavoring the charge of popcorn kernels having a mean distribution curve particle size less than and equal to 20 microns,
wherein the charge of seasoning provides a second perceived taste impact greater than a third perceived taste impact, which would be provided by a charge of the seasoning having a mean distribution curve particle size greater than 20 microns.

48. The seasoned ready to eat popcorn product in claim 47, wherein the charge of seasoning includes at least one of sodium chloride and potassium chloride.

49. The seasoned ready to eat popcorn product in claim 47, further comprising a second charge of seasoning selected for at least one of complementing the first charge of seasoning and reducing the amount of the first charge of seasoning required for flavoring the food product, wherein the second charge of seasoning has a mean particle size less than 20 microns.

50. The seasoned ready to eat popcorn product in claim 49, wherein the second charge of seasoning includes at least one of sodium chloride, potassium chloride, a bulking agent, and a bitterness masking agent.

51. The seasoned ready to eat popcorn product in claim 50, wherein the bulking agent comprises at least one of starch and a starch derivative.

52. The seasoned ready to eat popcorn product in claim 49, wherein the first charge of seasoning is deposited at least partially around the second charge of seasoning.

53. The seasoned ready to eat popcorn product in claim 52, wherein the first charge of seasoning includes salt and the second charge of seasoning includes at least one of starch and a starch derivative.

54. The seasoned ready to eat popcorn product claim 47, wherein at least a portion of the charge of seasoning is deposited on the charge of popcorn kernels.

55. The seasoned ready to eat popcorn product in claim 47, wherein the charge of seasoning is deposited on the charge of popcorn kernels via at least one of spraying and sputtering.

56. The seasoned ready to eat popcorn product in claim 47, wherein the salt includes at least one of a natural sea salt, a manufactured sea salt, and a flavored salt.

57. The seasoned ready to eat popcorn product in claim 47, further comprising a cookware release composition, wherein the cookware release composition functions as a carrier for the first charge of seasoning.

58. The seasoned ready to eat popcorn product in claim 47, wherein the seasoned ready to eat popcorn product is at least 50% fat free.

* * * * *

(12) EX PARTE REEXAMINATION CERTIFICATE (8837th)
United States Patent
Jensen et al.

(10) Number: US 7,923,047 C1
(45) Certificate Issued: *Jan. 31, 2012

(54) SEASONING AND METHOD FOR SEASONING A FOOD PRODUCT WHILE REDUCING DIETARY SODIUM INTAKE

(75) Inventors: Michael Jensen, Omaha, NE (US); Gordon Smith, Omaha, NE (US); Shawn Fear, Omaha, NE (US); Lance Schilmoeller, Omaha, NE (US); Clinton Johnson, Omaha, NE (US)

(73) Assignee: ConAgra Foods RDM, Inc.

Reexamination Request:
No. 90/011,701, May 19, 2011

Reexamination Certificate for:
Patent No.: 7,923,047
Issued: Apr. 12, 2011
Appl. No.: 11/708,667
Filed: Feb. 20, 2007

(*) Notice: This patent is subject to a terminal disclaimer.

Related U.S. Application Data

(60) Provisional application No. 60/817,993, filed on Jun. 30, 2006, provisional application No. 60/847,724, filed on Sep. 27, 2006, provisional application No. 60/847,725, filed on Sep. 27, 2006, provisional application No. 60/847,734, filed on Sep. 27, 2006, and provisional application No. 60/847,739, filed on Sep. 27, 2006.

(51) Int. Cl.
*A23L 1/22* (2006.01)

(52) U.S. Cl. .......................... 426/97; 426/279; 426/289; 426/302; 426/443; 426/534; 426/549; 426/601; 426/648; 426/649; 426/74; 426/99

(58) Field of Classification Search ....................... None
See application file for complete search history.

(56) References Cited

To view the complete listing of prior art documents cited during the proceeding for Reexamination Control Number 90/011,701, please refer to the USPTO's public Patent Application Information Retrieval (PAIR) system under the Display References tab.

*Primary Examiner*—Stephen Stein

(57) ABSTRACT

A seasoning for reducing dietary sodium intake is disclosed. The portion of seasoning has a mean particle size of less than or equal to 20 microns. In one embodiment, the invention is a seasoning comprising a first seasoning component including a salt and a second seasoning component selected for at least one of complementing and reducing the amount of the first seasoning component required for flavoring a food product.

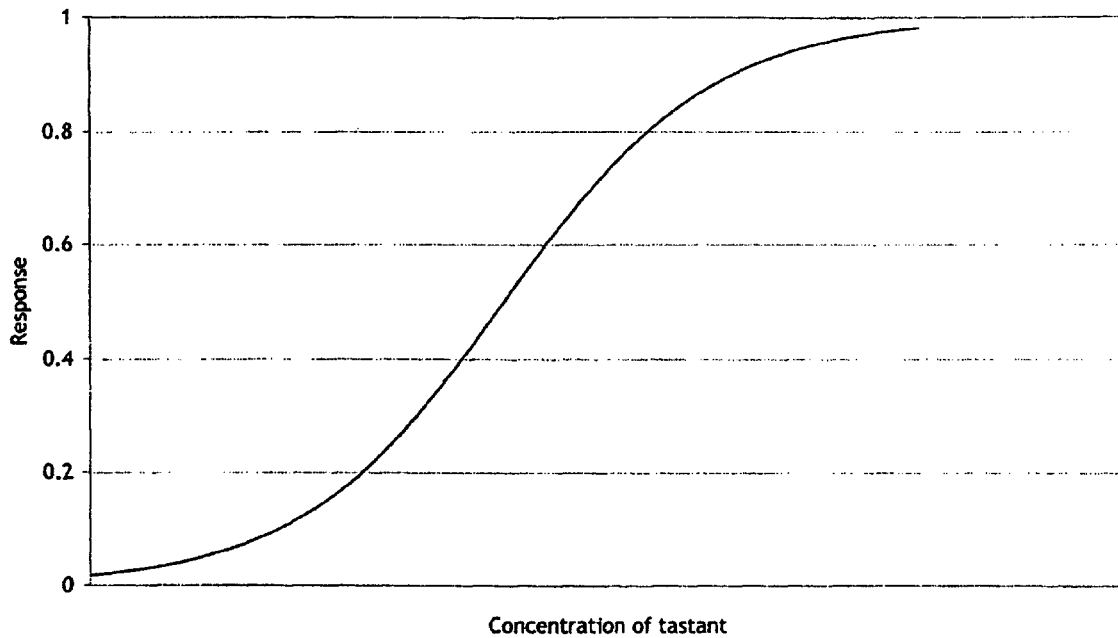

Simplified Dose-Reponse Curve

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-58 is confirmed.

* * * * *